(12) United States Patent
Travaglini

(10) Patent No.: US 12,507,647 B2
(45) Date of Patent: Dec. 30, 2025

(54) METHOD FOR GROWING AGRICULTURAL PRODUCTS IN CLOSED ENVIRONMENTS COMPRISING A PLURALITY OF AIR CONDITIONED ROOMS

(71) Applicant: TRAVAGLINI S.p.A., Milan (IT)

(72) Inventor: Luca Travaglini, Milan (IT)

(73) Assignee: TRAVAGLINI S.p.A., Milan (IT)

(*) Notice: Subject to any disclaimer, the term of this patent is extended or adjusted under 35 U.S.C. 154(b) by 0 days.

(21) Appl. No.: 16/756,605

(22) PCT Filed: Oct. 19, 2018

(86) PCT No.: PCT/IB2018/058146
§ 371 (c)(1),
(2) Date: Apr. 16, 2020

(87) PCT Pub. No.: WO2019/077571
PCT Pub. Date: Apr. 25, 2019

(65) Prior Publication Data
US 2020/0260673 A1    Aug. 20, 2020

(30) Foreign Application Priority Data

Oct. 20, 2017   (IT) ................. 102017000118967

(51) Int. Cl.
*A01G 31/06*      (2006.01)
*A01G 7/04*       (2006.01)
(Continued)

(52) U.S. Cl.
CPC ............ *A01G 31/06* (2013.01); *A01G 7/045* (2013.01); *A01G 9/246* (2013.01); *A01G 9/143* (2013.01); *A01G 9/247* (2013.01)

(58) Field of Classification Search
CPC ........ A01G 31/06; A01G 9/143; A01G 9/246; A01G 9/24; F24F 2011/0004; F24F 5/0046; F24F 2005/0064
(Continued)

(56) References Cited

U.S. PATENT DOCUMENTS 4,028,847 A * 6/1977 Davis .................. A01G 31/042
165/59
4,163,342 A * 8/1979 Fogg ..................... A01G 9/249
47/DIG. 6
(Continued)

FOREIGN PATENT DOCUMENTS

CH          697385 B1     9/2008
GB          1512606    *  6/1978   ........... A01G 31/042
(Continued)

*Primary Examiner* — Joshua D Huson
*Assistant Examiner* — Katherine Anne Kloecker
(74) *Attorney, Agent, or Firm* — FisherBroyles, LLP; Roger L. Browdy; James E. Mrose

(57) ABSTRACT

In a system and method for growing agricultural products in closed environments, particularly for vertical farms, the agricultural are arranged products on a plurality of trays; the trays are arranged in a plurality of air conditioned grow rooms inside a closed environment, each room having artificial lighting and optimized climatic conditions for a determined type of agricultural products or for a specific growth phase of the agricultural products; the trays are moved from a first grow room to a second grow room, each grow room having artificial lighting parameters and differentiated climate control based on a certain growth phase of the agricultural products moved.

6 Claims, 22 Drawing Sheets

(51) Int. Cl.
*A01G 9/24* (2006.01)
*A01G 9/14* (2006.01)

(58) Field of Classification Search
USPC .......................................................... 454/187
See application file for complete search history.

(56) References Cited

U.S. PATENT DOCUMENTS

| | | | |
|---|---|---|---|
| 10,973,186 B2 * | 4/2021 | Blackburn | A01G 9/029 |
| 11,185,027 B2 * | 11/2021 | Christiaens | A01G 31/06 |
| 11,370,171 B2 * | 6/2022 | Gatenholm | B29C 64/245 |
| 2009/0050444 A1 | 2/2009 | Vyakarnam et al. | |
| 2012/0077429 A1 * | 3/2012 | Wernimont | F24F 3/167 |
| | | | 52/302.1 |
| 2017/0142912 A1 * | 5/2017 | Gasmer | A01G 29/00 |
| 2017/0265408 A1 | 9/2017 | McGowan et al. | |
| 2018/0014487 A1 * | 1/2018 | Tinsley | A01G 9/12 |

FOREIGN PATENT DOCUMENTS

| | | | | |
|---|---|---|---|---|
| GB | 1512606 A | | 6/1978 | |
| GB | 2516958 A | * | 2/2015 | ........... A01G 9/1415 |
| JP | 2005073673 A | * | 3/2005 | |
| KR | 20020011225 A | * | 2/2002 | |
| WO | 85/00269 | | 1/1985 | |
| WO | 2013082601 A1 | | 6/2013 | |
| WO | 2013113096 A1 | | 8/2013 | |
| WO | 2013165248 A1 | | 11/2013 | |
| WO | 2015/162466 A1 | | 10/2015 | |
| WO | WO-2017024353 A1 | * | 2/2017 | ............. A01G 9/249 |
| WO | WO-2017083692 A1 | * | 5/2017 | ............. A01G 31/02 |
| WO | WO-2017084679 A2 | * | 5/2017 | ............. A01G 9/246 |

* cited by examiner

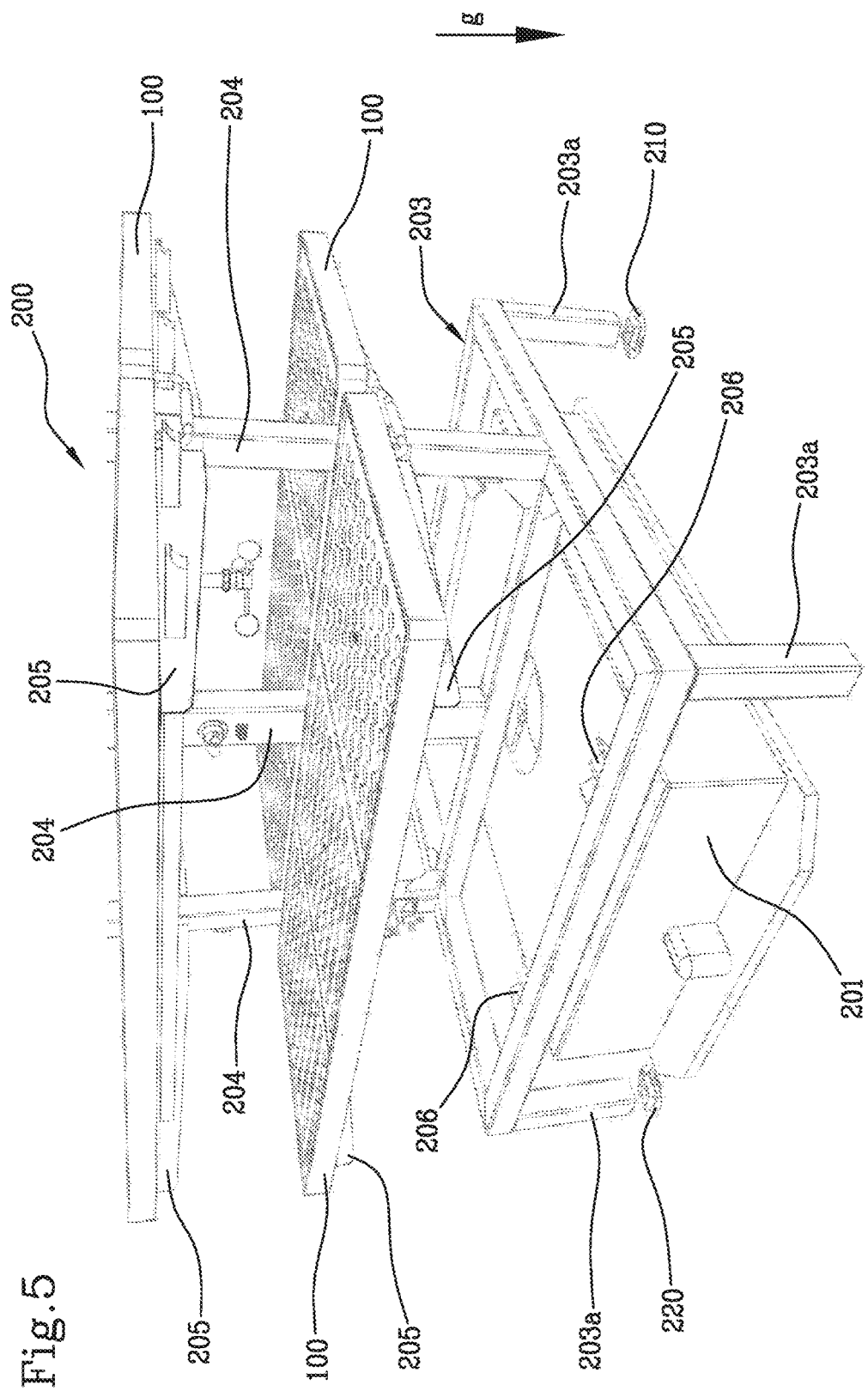

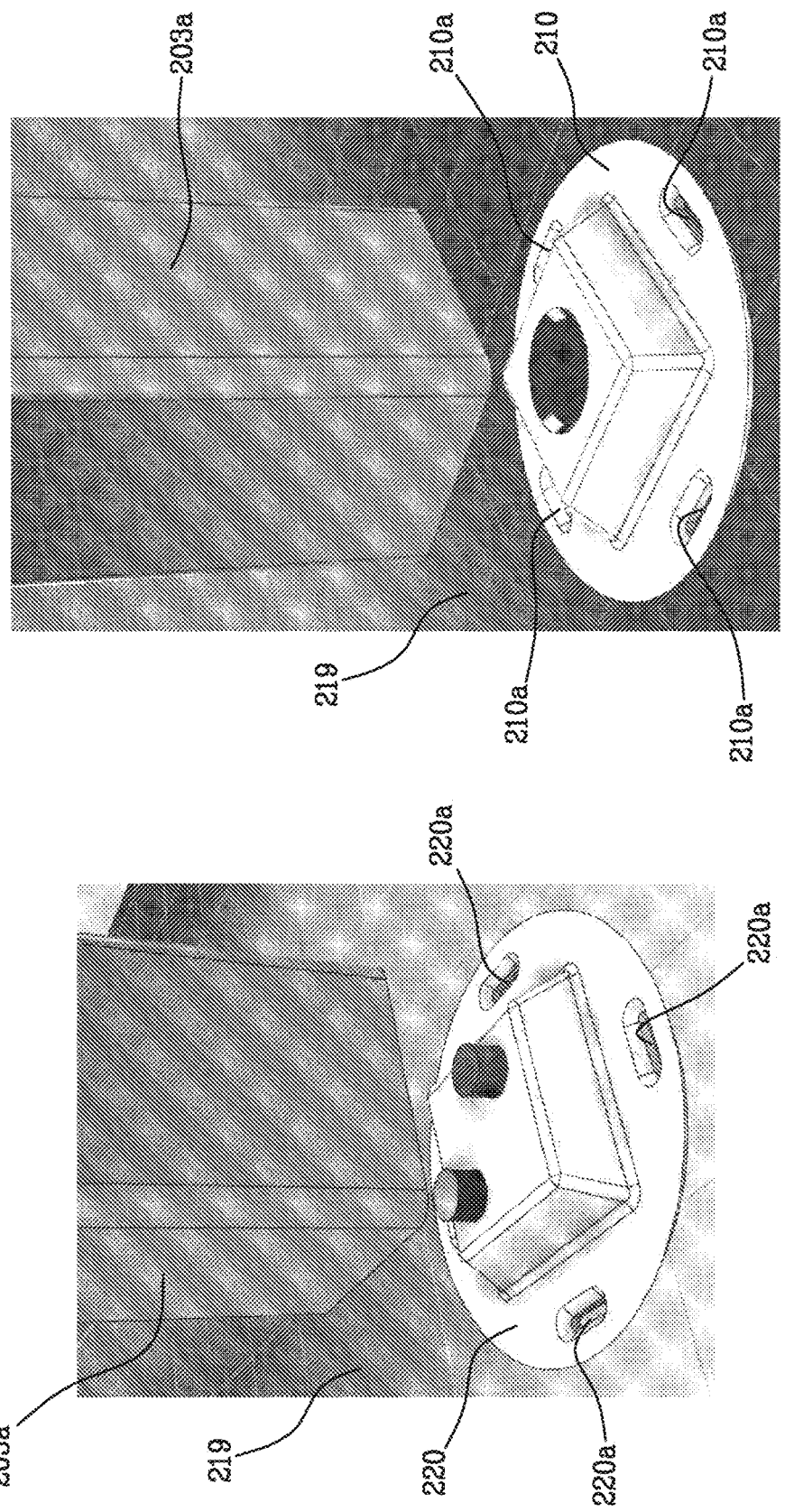

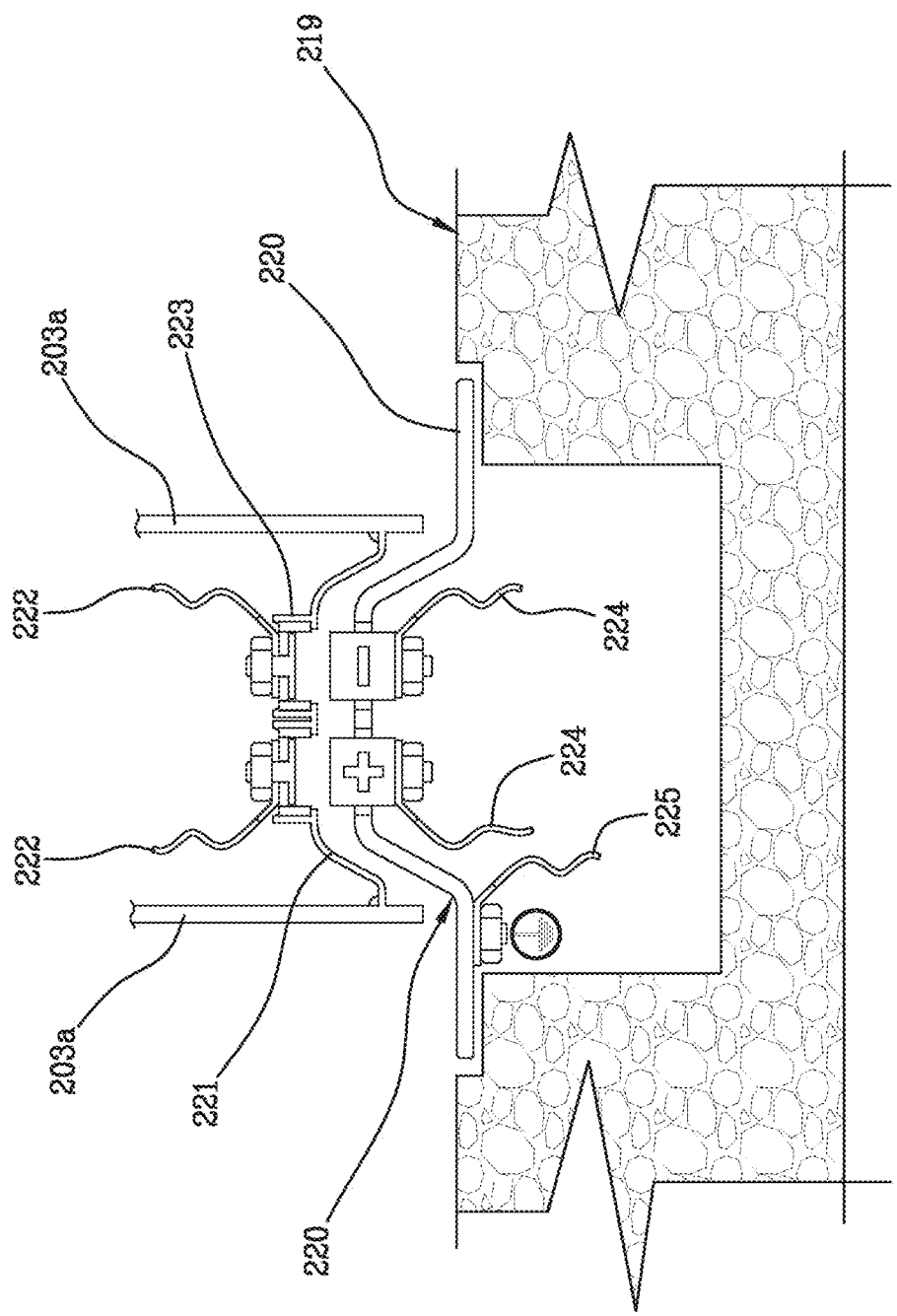

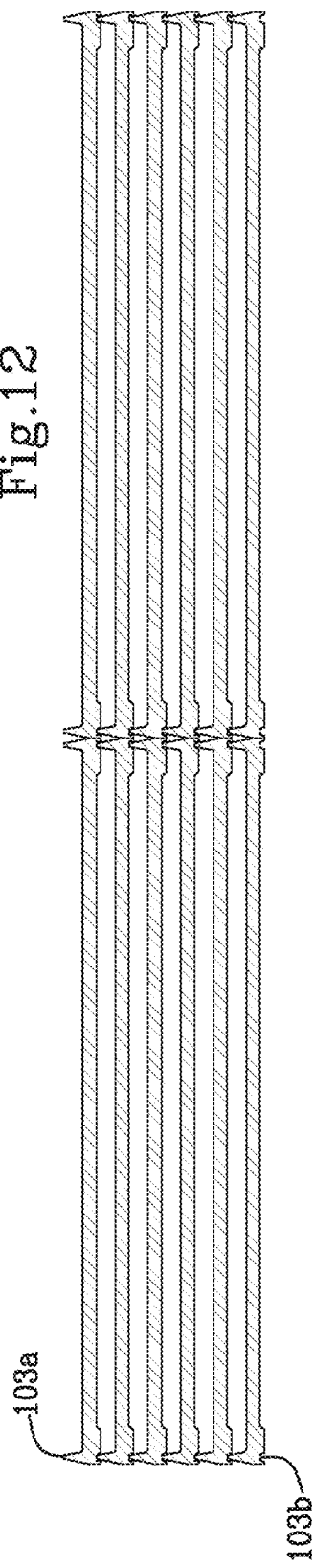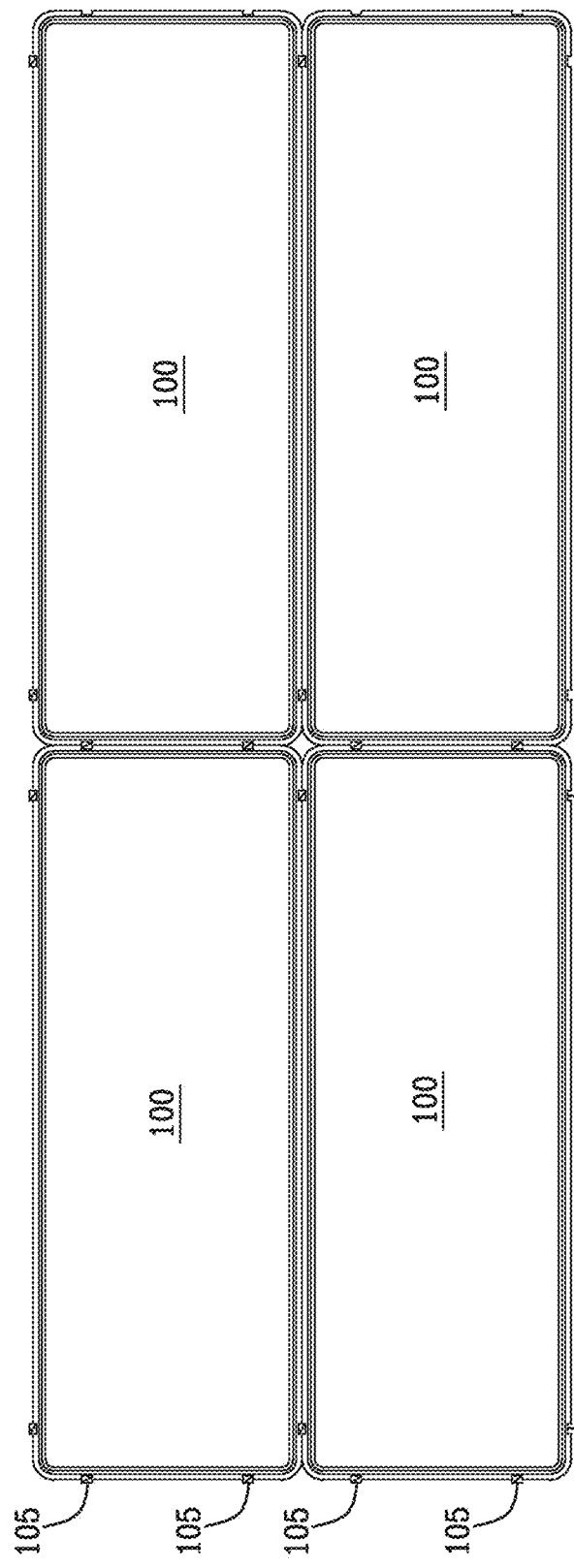

METHOD FOR GROWING AGRICULTURAL PRODUCTS IN CLOSED ENVIRONMENTS COMPRISING A PLURALITY OF AIR CONDITIONED ROOMS

TECHNICAL FIELD

The present invention relates to a method for growing agricultural products in closed environments, in particular for vertical farms, comprising a plurality of air conditioned growing rooms containing therein a plurality of structures, each of which comprises a plurality of trays for growing agricultural products.

PRIOR ART

A vertical farm is characterised by a closed environment able to contain all the functions necessary for farming indoors, which has many advantages:
- reduces the consumption of soil, as the farming is carried out on several levels;
- avoids the impoverishment of the soil and the loss of minerals;
- avoids run-off which carries potentially harmful substances to the sea or aquifers;
- creates a closed and controlled farming environment, a structure which is productive 12 months per year, regardless of the seasons or the weather;
- prevents the entry of parasites, insects or weeds, thereby eliminating any need for pesticides and herbicides;
- drastically limits the consumption of water (up to 95% compared to crops in soil), which is recovered and reused in these systems several times;
- increases productivity compared to conventional crops.

Farming plant products in closed environments with artificial lighting is currently organised by means of a plurality of fixed metal shelvings on which the individual farming trays are inserted and moved.

The necessary systems for the plant products' growth are mounted on said shelvings. Such systems can comprise a lightening system, certain monitoring and control systems of the environment and the crop, an irrigation and fertilisation system, and possibly a water analysis system.

Currently, agricultural products grown in closed environments (whether greenhouses, vertical greenhouses or "vertical farms") with artificial lighting employ fluorescent lamps and/or lamps based on light emitting diodes ("LED") of maximum intensity and with high emissions in units $\mu mol/m^2/sec$.

Depending on the type of plants and their relative growth stages, it is known that the artificial light sources are switched on or off to increase or decrease the amount of $\mu mol/m^2/sec$.

Certain known vertical farms and research laboratories use expensive artificial light sources equipped with systems that regulate the intensity of the light (said "dimmers"), which are able to increase or decrease the absorbed power and consequently also the quantity of light that touches the plants.

A drawback of the artificial lighting systems currently used in vertical farms, as described above, is that they involve a high initial economic investment, a greater waste of materials (wiring, mounting accessories, electric control units, etc.) and greater electrical leakage due to the presence of the dimmers.

A further drawback of lighting systems for known vertical farms is given by the inhomogeneity of the life cycle of the artificial light sources present in the same growing rooms, given that some of the artificial light sources are not always used and remain off, thereby making it impossible to determine the average decay of artificial light within a room.

A further drawback of known growing systems is that the artificial light sources with thousands of working hours can be in the same growing room, side by side with others with only a few hundreds of working hours, creating uneven irradiation on the plants.

An object of the present invention is to provide a method for growing agricultural products in closed environments comprising a plurality of rooms, each optimized for a certain type of agricultural product or for a specific growth phase of agricultural products.

An object of the present invention is to diversify the luminous power installed in each room depending on the growth phase and type of plant. This differentiation makes it possible to optimize both the electrical consumption of the lighting system, and the power consumption due to the action of the air conditioning system which must dissipate less heat produced by the lamps.

A further object of the present invention is to provide a method for growing agricultural products in closed environments, wherein the growing rooms are air conditioned through air treatment systems of a size corresponding to a certain growth phase of the agricultural products.

A further object of the present invention is to provide a method for growing agricultural products in closed environments that guarantees the homogeneity of the life cycle and uniform irradiation of the artificial light sources present in the same growing room.

A further object of the present invention is to provide a method for growing agricultural products in closed environments wherein it is always possible to determine the average decay of the artificial light within a growing room.

A further object of the present invention is to provide a method for growing agricultural products in closed environments that allows the optimum growth of plant products.

A further object of the present invention is to provide a method for growing agricultural products in closed environments that is competitive from a purely economic point of view.

A further object of the present invention is to provide a method for growing agricultural products in closed environments that is simple and efficient.

Object of the Invention

The present invention describes a method for growing agricultural products in closed environments, particularly for vertical farms.

Other advantageous aspects of the method for growing agricultural products in closed environments are described herein.

The present invention also describes a system for growing agricultural products in closed environments, particularly for vertical farms.

The invention gives the main technical effect of providing a method and a system for growing agricultural products in closed environments comprising a plurality of rooms with differentiated environmental conditions that is able to reproduce the ideal conditions for the different growth phases of the agricultural product.

In particular, the invention, as described, achieves the following technical effects:

provide growing rooms set up with artificial light sources which are differentiated in order to optimize both consumption and the growth of agricultural products;

avoid non-uniform irradiation on the plants present in the same growing room;

avoid inhomogeneity in the life cycle of the artificial light sources in the same growing room;

minimize the use of electrical equipment for the installation of artificial light sources;

minimize the electrical leakage from artificial light sources;

give a specific air conditioning system for a room a certain size calculated on the basis of the heat produced by the type and power of the lamps installed therein.

provide a system for the distribution of conditioned air optimized for a certain growth phase of the agricultural products, by minimizing the differences in temperature, humidity and air flow on cultivated surfaces;

minimize contamination from the external environment and contact with staff;

grow plant products while maintaining a harmful bacteria level minimum or even absent;

grow plants without the use of pesticides, plant protection products and other products considered harmful to human health, to the plant itself and for the environment.

The technical effects mentioned, advantages cited and other technical effects/advantages of the invention will emerge in further detail from the description provided herein below of an example embodiment provided by way of approximate and non-limiting example with reference to the attached drawings.

BRIEF DESCRIPTION OF THE DRAWINGS

FIG. 5 shows the connection between the electrical system and water system of the rigid structure respectively with the electrical distribution grid and the water system of the fertirrigation system.

FIG. 6 shows a detail of the electrical coupling between the rigid structure and the electric distribution grid.

FIG. 6a shows a sectional front view of the electrical coupling of FIG. 6.

FIG. 7 shows a detail of the water coupling between the rigid structure and the water network of the fertirrigation system.

FIG. 12 shows a sectional view of a plurality of stacked trays.

FIG. 13 shows a view from above of a plurality of trays joined laterally.

DETAILED DESCRIPTION OF PREFERRED EMBODIMENTS OF THE INVENTION

The invention describes a tray for farming agricultural products, particularly for vertical farms, comprising a rigid single-block structure having a base adapted to contain agricultural products, constituted by a hollow body hermetically sealed towards the external environment.

In a first aspect, the present invention describes a tray 100 for farming agricultural products, particularly for vertical farms, comprising a rigid structure having a base 101 and made by means of a single-block structure.

Figure 11A:
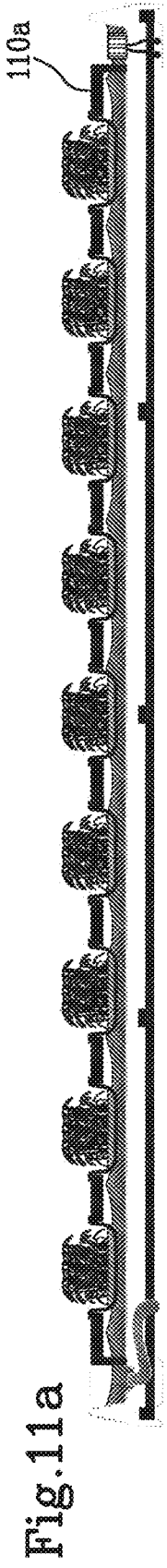
FIGS. 11a, 11b, 11c, 11d show a sectional view of the tray of FIGS. 8a and 8b with the plant products.
Figure 11B:
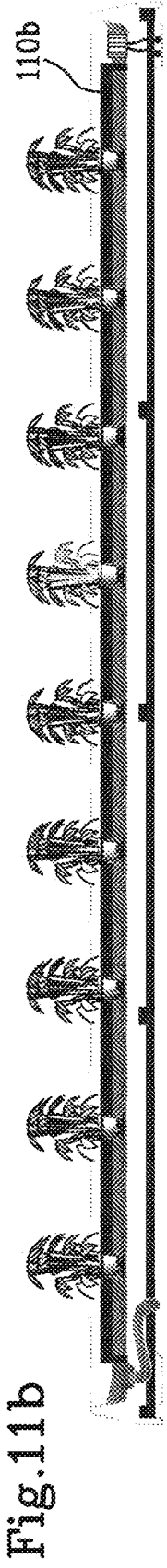
Figure 11C:
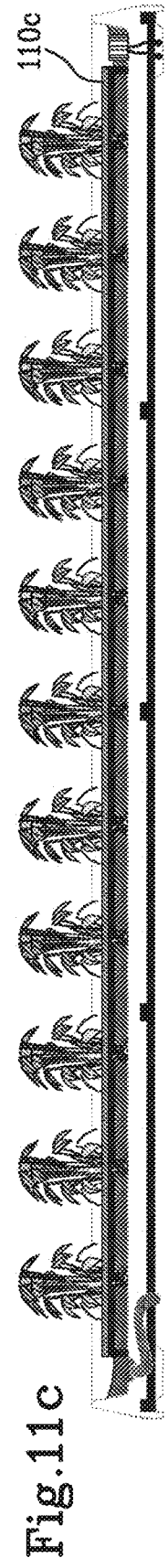
Figure 11D:
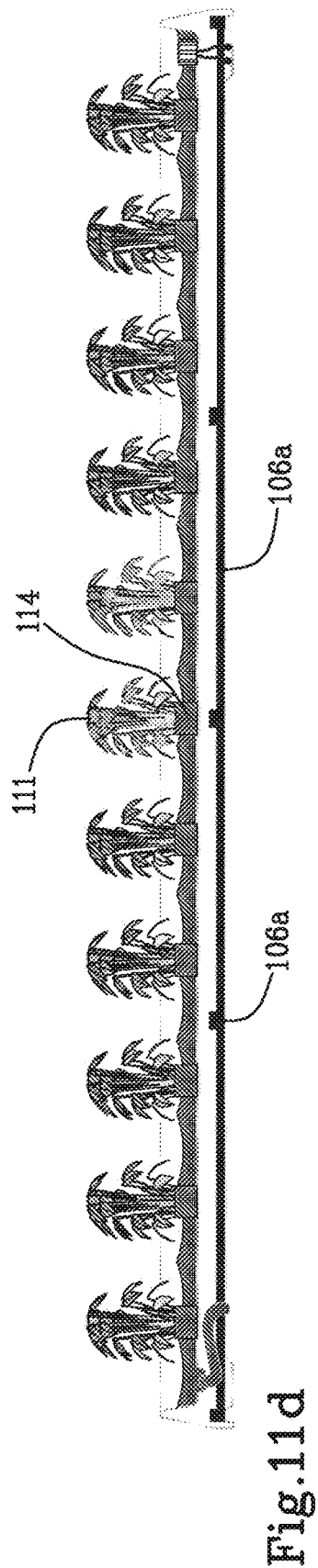

The base 101 is adapted to contain special supports 110a, 110b, 110c for agricultural products 111. As shown in FIG. 11d, the agricultural products 111 can also be arranged directly on the base of the tray 101, with the roots contained in a substrate 114.

The base of the tray 101 is closed on all the perimeter sides by a containment edge 104. The tray 100 is hermetically sealed (water or fertiliser or other liquids) if filled with a fluid within the height of the containment edge 104.

Figure 9:
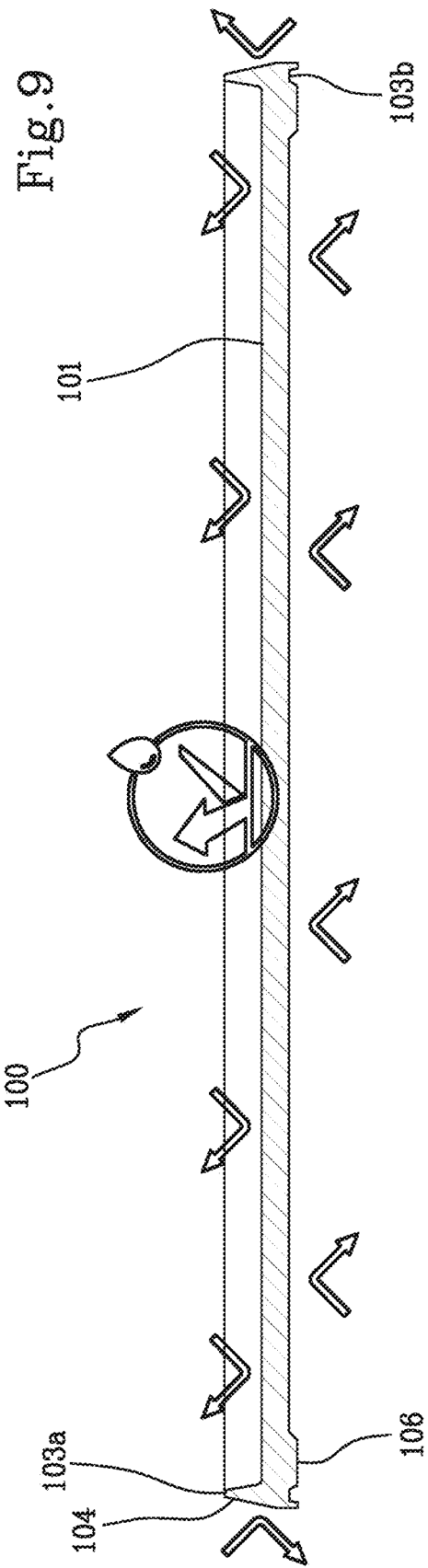
FIG. 9 shows a sectional view of the tray of FIGS. 8a and 8b.

Furthermore, as shown in FIG. 9, the base 101 and the containment edge 104 form a single body which is hollow and hermetically sealed toward the outside of the tray 100.

The tray 100 is made of plastic material. For example, the tray can be made of plastic material such as PE (polyethylene) and other thermoplastic and thermosetting polymers and copolymers as well as elastomers adapted to be modelled through extrusion and injection moulding. It can also be made of synthetic or organic material, as well as of all those composite materials (matrix and reinforcing/filler) adapted to produce a single piece generated by means of a mould for series production.

Figure 8A:
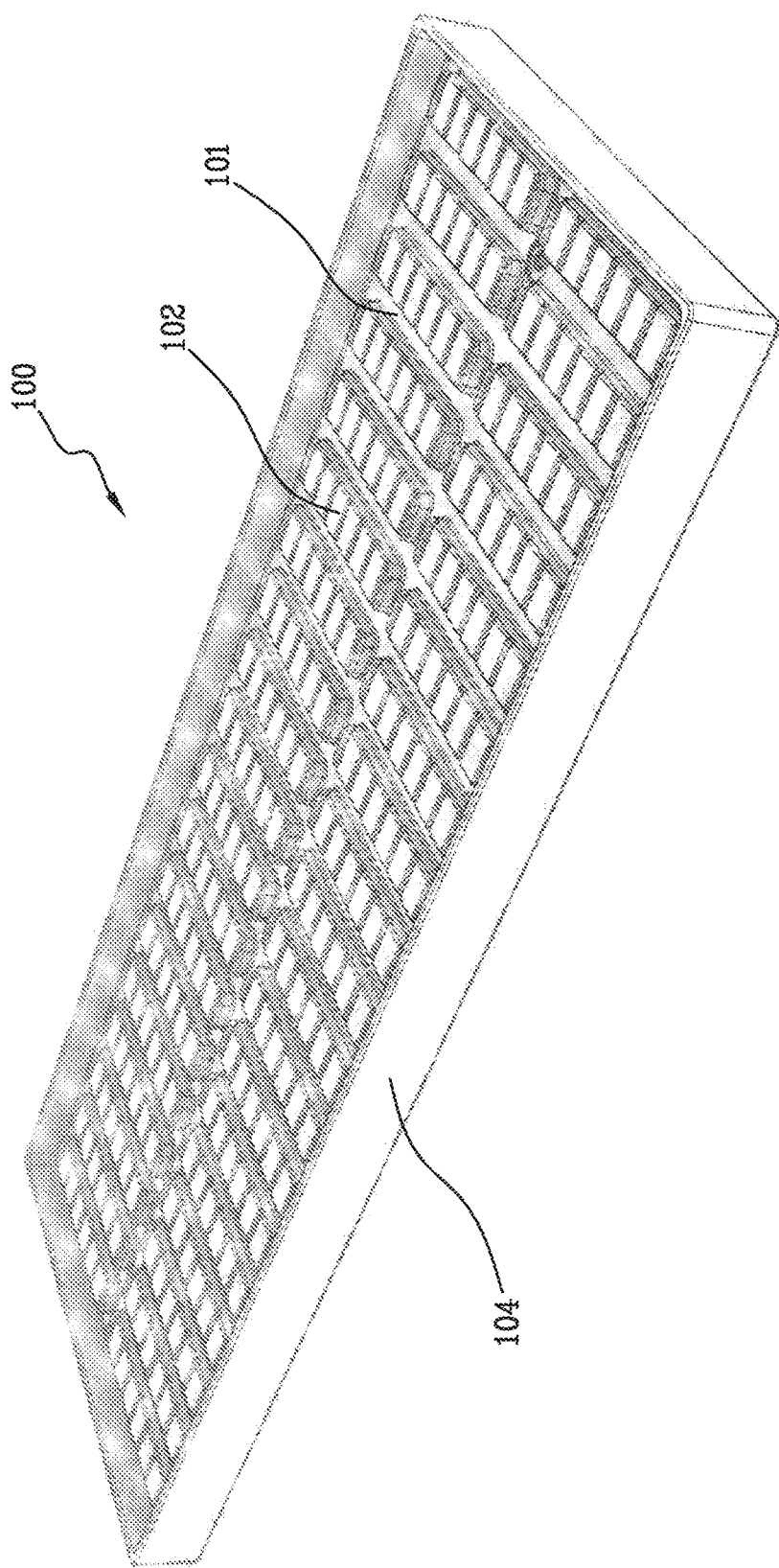
FIGS. 8a and 8b show a tray for vertical farms according to a first aspect of the present invention.
Figure 8B:
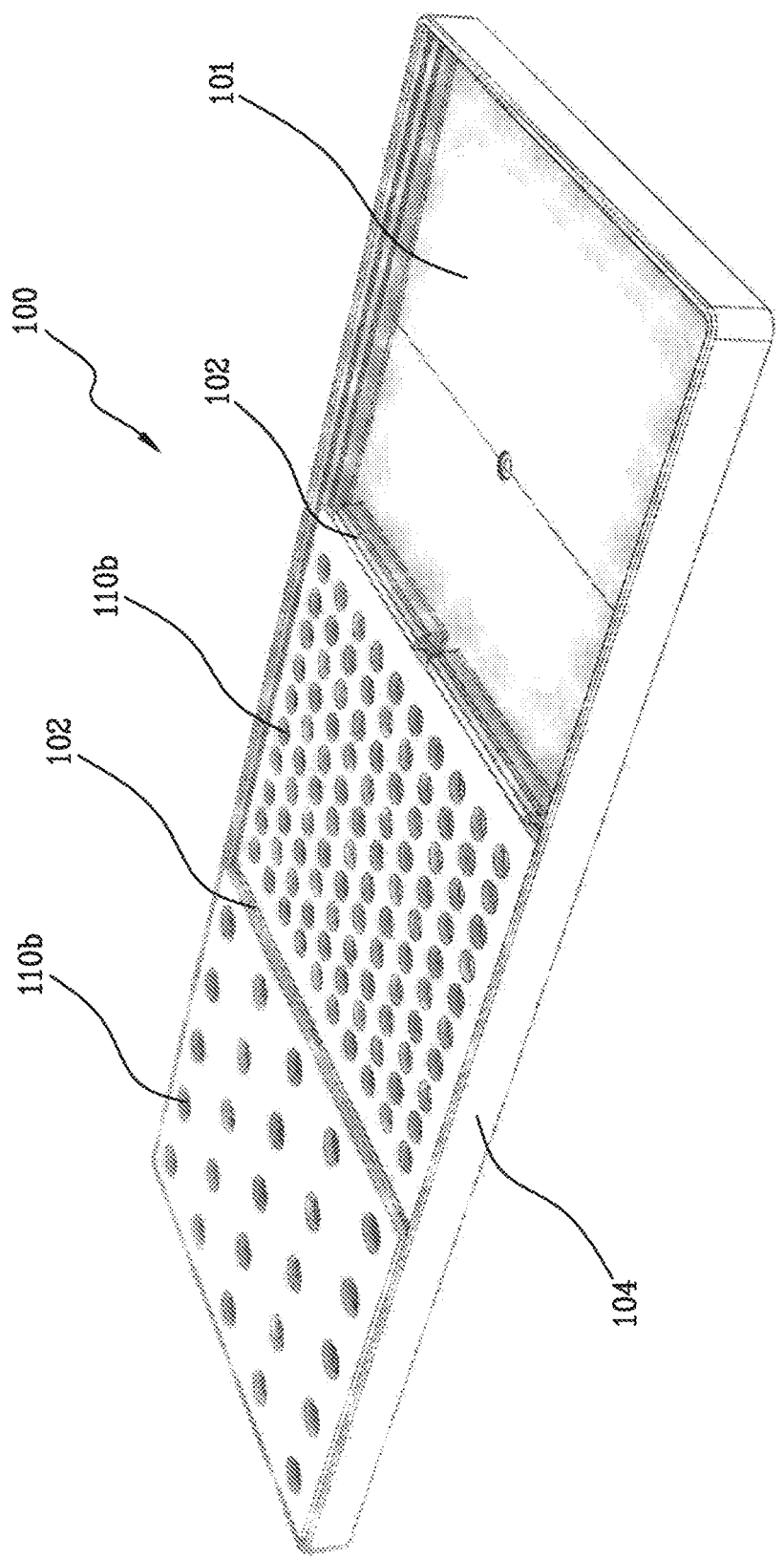
Figure 10A:
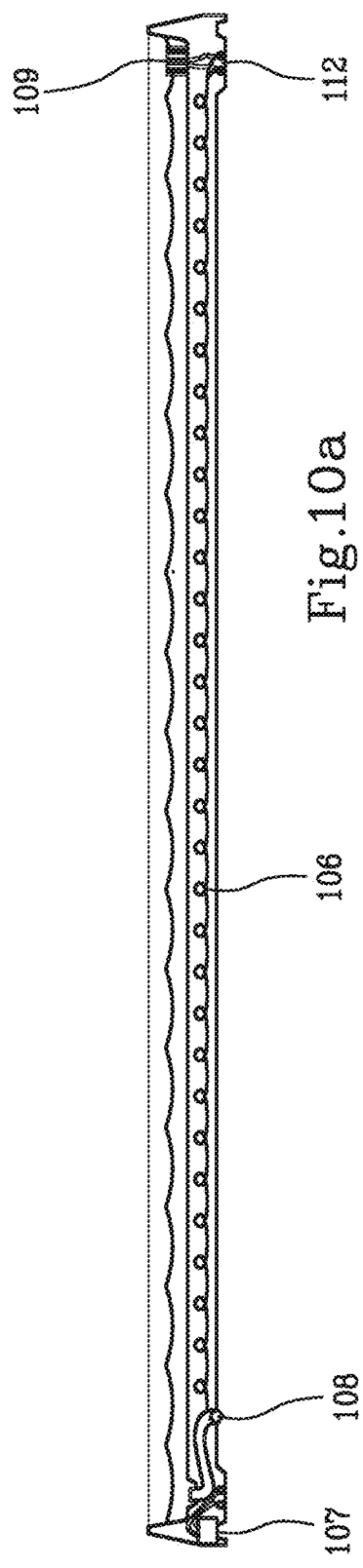
FIGS. 10a, 10b, 10c show a sectional view of various embodiment examples of the tray of FIGS. 8a and 8b.
Figure 10B:
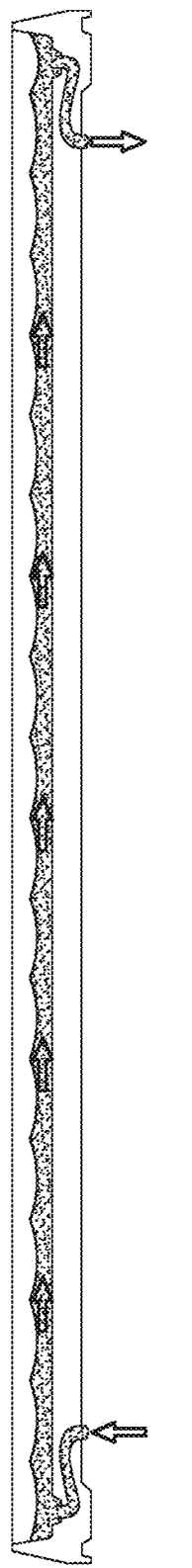
Figure 10C:
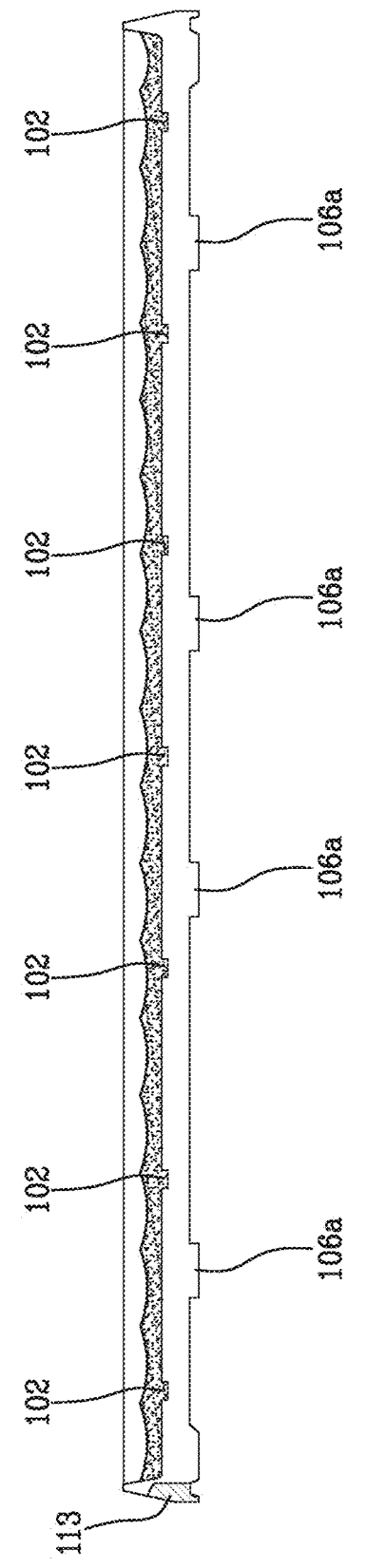

On the inner surface of the base 101 of the tray 100, a plurality of conduits 102 can be provided. The conduits 102 can be fashioned directly on the upper surface of the base 101, as shown in FIG. 10c, or on a plurality of protruding reinforcements 115 fashioned on the base 101, as shown in FIG. 8a.

The possible presence of conduits 102 facilitates the distribution of the flow and drainage of water and nutrients for the agricultural products 111.

The tray 100 comprises means 103a, 103b adapted to stack two or more trays 100.

The means 103a, 103b adapted to stack the trays 100 are constituted for example by a protrusion 103a present in the upper part of at least two opposite sides of the containment edge 104.

At the protrusion 103a, on the underside of the base 101 of the tray 100, a cavity 103b is present which is adapted to removably engage with the upper protrusion 103a of a second tray 100, as shown in FIGS. 9 and 12.

Preferably, the means 103a, 103b adapted to stack the trays are present on the perimeter edge of the tray 100.

As shown in FIG. 13, each tray 100 can comprise an engagement system 105 for engaging trays of the male-female, positive-negative or slot-pin type. This makes it possible to engage with a plurality of laterally adjacent trays 100 on the same plane of reference.

Preferably, the tray 100 comprises special supports 110a, 110b, 110c for agricultural products, able to maintain the agricultural products 111 in position inside the tray, distancing them from the base 101 of the tray 100, as shown in FIGS. 8b, 11a, 11b and 11c.

The supports 110a, 110b, 110c can be removed from the tray 100 and can directly contain the roots of agricultural products or the pots which themselves contain agricultural products.

In the example embodiment shown in FIG. 11d, the agricultural products 111 can also be arranged directly on the base 101 of the tray 100, possibly with the roots contained in a substrate 114.

The tray 100 can comprise one or more sensors 109 adapted to detect environmental parameters and parameters regarding the contents of the tray 100. Moreover, the tray 100 can contain one or more load cells 107 able to detect the weight of the product 111 contained in the tray 100.

Preferably, the tray 100 comprises means 106 adapted to heat or cool the contents of the tray 100 and a connection 112 to the electricity distribution grid capable of supplying it.

On the base 101 of the tray there can be one or more inputs/outputs 108 of the fertirrigation liquid of the plants 111.

Advantageously, the heating and cooling means 106, the load cells 107, the inputs/outputs 108 and the sensors 109, can be included inside the hollow and hermetically sealed body toward the environment outside the tray 100. In this way, it is possible to wash the tray after use without the water penetrating therein, thus avoiding damage to the various devices mentioned above.

On the upper surface of the base 101 of the tray 100 a plurality of grooves 102 are present which are also adapted to convey the excess liquids (not absorbed by the seedlings) toward a discharge area.

Preferably, below the lower surface of the tray 100 a plurality of ribs or reinforcements 106a adapted to provide rigidity and stability to the trays can be fashioned.

Preferably, on the surface of the base 101 of the tray, both internally and externally, localised reinforcements 113 can be present which are adapted to the mounting of accessories and equipment.

In a second aspect, the present invention describes a structure for growing and moving agricultural products, particularly for vertical farms, comprising a rigid frame able to house a plurality of trays for growing agricultural products and movement means adapted to move the rigid frame.

Figure 1:
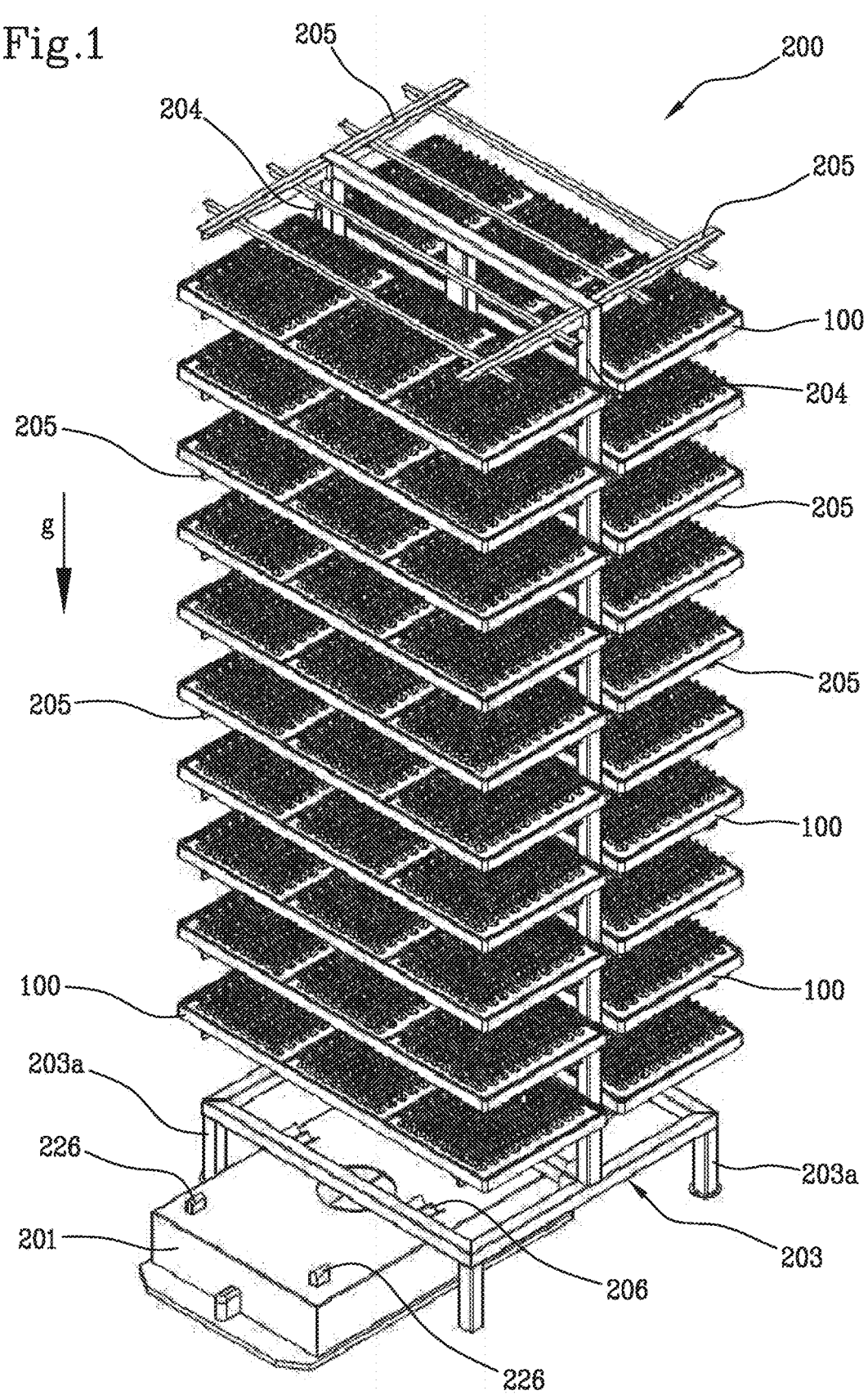
FIG. 1 shows a structure for farming and moving agricultural products according to a second aspect of the present invention.

Preferably the trays are those described in the first aspect of the invention. With reference to FIG. 1, a structure is shown for growing and moving agricultural products, particularly for vertical farms.

The structure 200 for growing and moving agricultural products comprises a rigid frame 202 able to house a plurality of growing trays 100 for agricultural products and movement means 201 adapted to move the rigid frame 202.

In particular, the rigid structure 202 comprises a base 203 that rests on the floor 219 of the vertical farm, at least two vertical uprights 204 and at least one pair of cross members 205 constrained to the uprights 204.

Preferably, the rigid structure 202 comprises three vertical uprights 204, one of which is central and two lateral.

At least two vertical uprights 204 are hollow inside and can be adapted to contain a canalization 216 for the fertirrigation fluid of agricultural products contained in the trays 100 and electric cables 222 adapted to supply the various electrical devices present in the rigid structure 202, such as for example sensors and/or an artificial lighting system. The electric cables 222 and the canalization 216 are preferably housed inside separated uprights, for safety reasons.

These water and/or electrical connections can be created outside the frame of the trolley and have the supply point on the floor, wall or ceiling.

The cross members 205 are adapted to support one or more growing trays 100, containing a plurality of agricultural products and are arranged substantially perpendicular to the vertical uprights 204.

Preferably, the rigid structure 202 comprises a plurality of pairs of cross members 205, each pair of cross members can be arranged at a variable height which can be modified as desired, in order to be able to thereby adapt to the type of crop present in the trays 100 in such a way as to optimize the space between the trays.

Each pair of cross members 205, located at the same height and able to support a specific tray 100, comprises a plurality of through holes 208 aligned in such a way as to be able to house and support longitudinal elements 209, perpendicular to the cross members 205, containing the artificial lighting and means for connection to the electric supply grid, passing inside one of the vertical uprights 204.

The base 203 of the rigid structure 202 is preferably constituted by four tubular elements, defining a substantially rectangular shape.

The base 203 of the rigid structure 202 comprises a plurality of support feet 203a for the floor 219 of the vertical farm.

The structure 202 comprising the support feet 203a and the base 203, has a geometry that is adapted to allow the input, placement underneath it, coupling, lifting and output of movement means 201.

Figure 2:
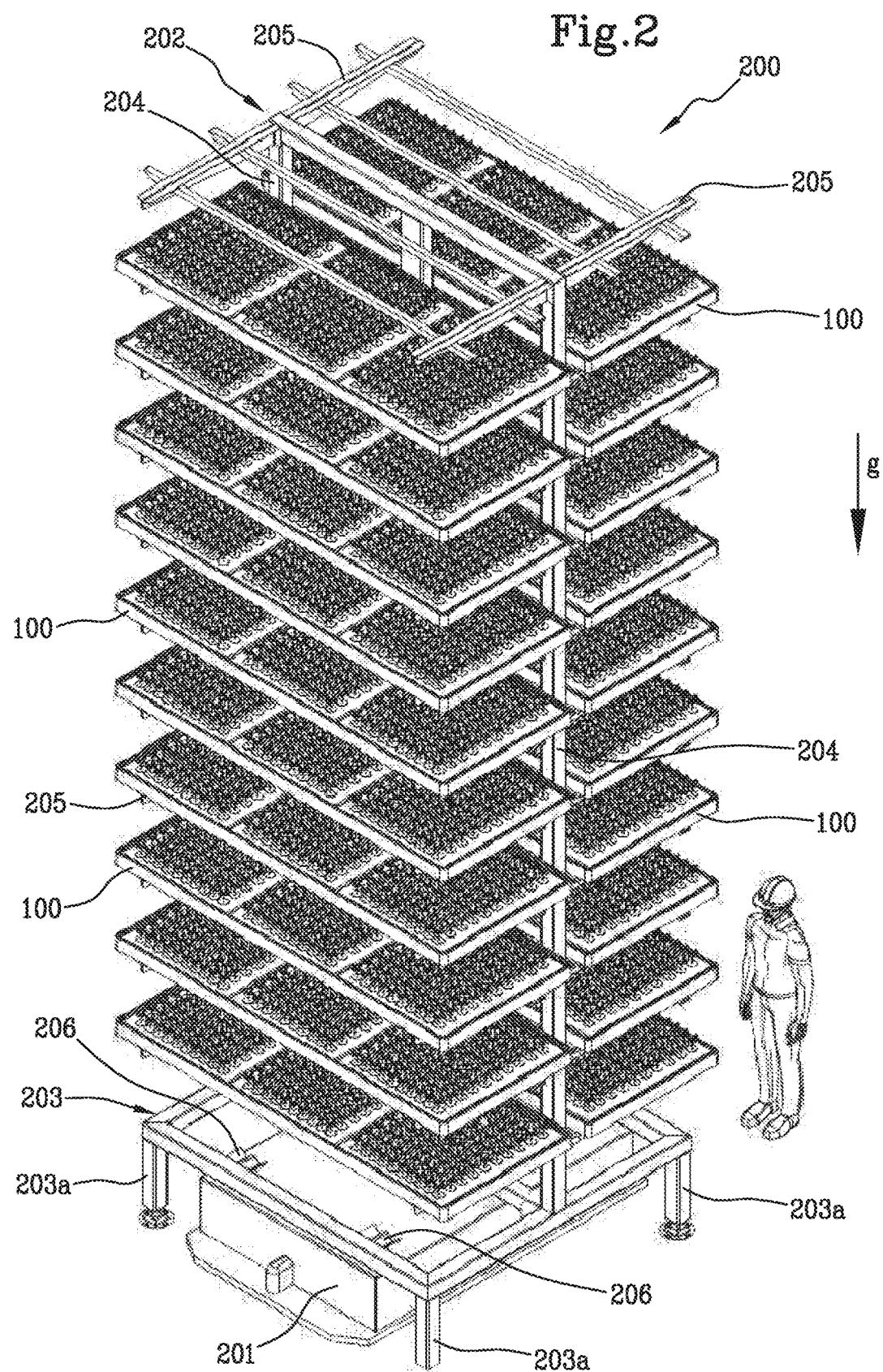
FIG. 2 shows a detail of the structure for farming and moving agricultural products of FIG. 1, wherein the movement means are below the base of the rigid structure.
Figure 3:
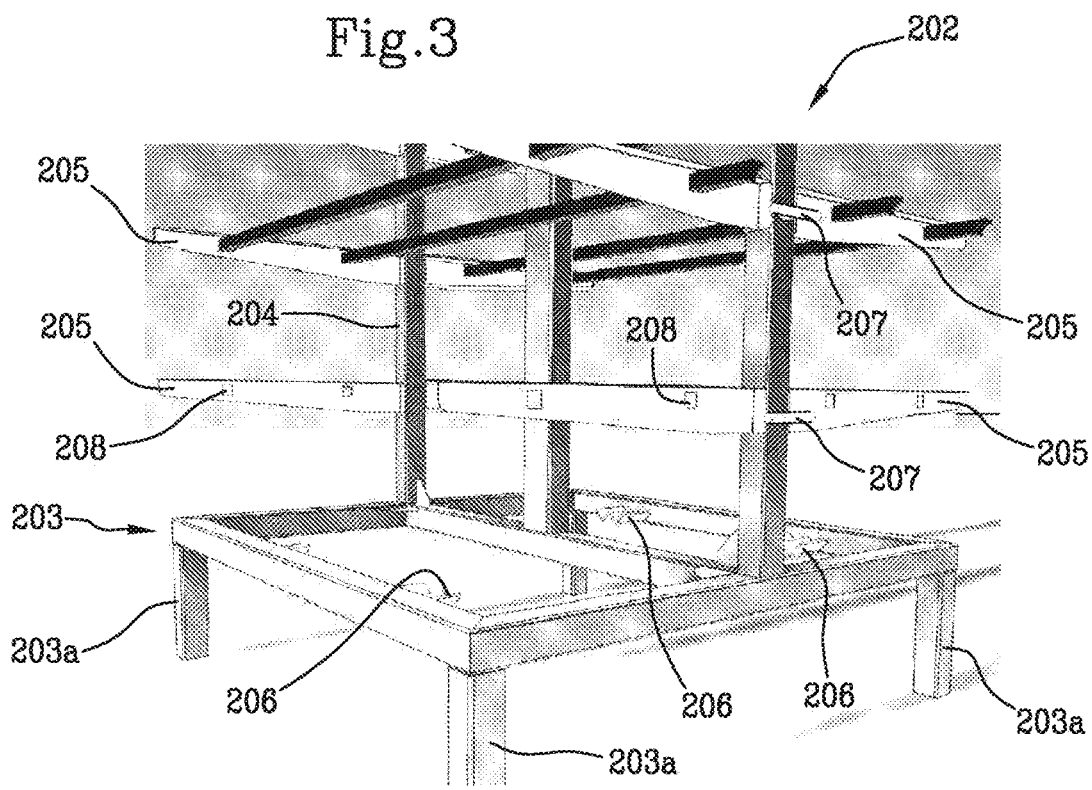
FIG. 3 shows a detail of the rigid structure.
Figure 4:
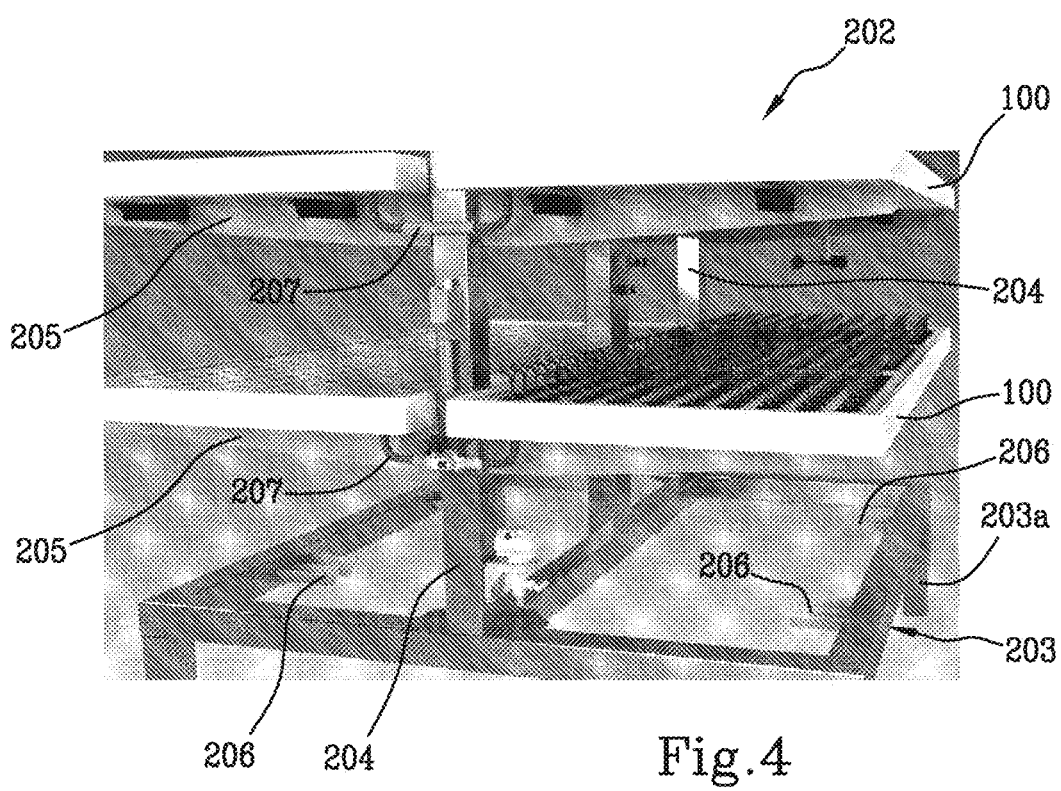
FIG. 4 shows a detail of the rigid structure of FIG. 3 with the trays and various accessories.

As shown in FIGS. 1, 2 and 3, the base 203 comprises a plurality of elements 206 for the self-alignment, coupling and lifting of the rigid structure 202 from the floor 219 of the vertical farm.

Preferably, the alignment and lifting elements 206 are four elements, arranged in pairs on two opposite sides of the tubular elements that constitute the base 203.

The movement means 201 comprise movable elements 226 on the upper surface adapted to couple with the alignment and lifting elements 206 present in the base 203 of the rigid structure 202. In particular, the movable elements 226 can be operated by jacks.

In particular, the movement means 201 move on the floor 219 of the vertical farm, until they are positioned below the base 203. Once positioned below the base 203, the movable elements 226 are raised up to align and couple with the corresponding fixed elements 206 and are able to lift the entire rigid structure 202 upwards, of a height such that it can be moved on the inside or outside of the vertical farm, while at the same time ensuring its stability. In this way, all the trays and agricultural products contained therein, hosted in the rigid structure 202, are moved at the same time. These movable lifting elements can have different shapes and geometries, as well as be a single element such as a platform. Where necessary, the same lifting elements 216 can operate mechanisms that constrain the movement means 201 at the base 203.

Once the movement means 201 have moved the rigid structure 202, from a first departure position to a second position of desired arrival, the movable elements 226 of the same are lowered inside the upper surface of the movement means 201, in this way uncoupling from the corresponding fixed elements 206 present in the base 203 of the rigid structure 202.

The movement means 201 can comprise automatic vehicles capable of automatically moving between a plurality of planned positions and autonomously couple with the base 203 of the rigid structure 202.

The automatic vehicles can be magnet-guided, laser-guided, wire-guided and GPS-guided ("Global Positioning System").

Alternatively, the movement means 201 can be manual or self-propelled.

The movement means 201 can move freely on the floor of the vertical farm or be designed to move on rails, tracks or guides placed on the floor, wall or ceiling of the vertical farm.

The movement means 201 can be positioned below the base of the rigid frame 202, lift it and move it wherever desired. For example, the rigid structure can be moved between two different rooms within the same shed with different lighting and air conditioning conditions, or in an area allocated to the performance of maintenance operations.

The movement means 201 comprise a device for connection to the electrical supply grid in order to carry out charging operations.

In one non-limiting embodiment, the system of FIGS. 5, 6 and 6a shows at least one support foot 203a of the rigid structure 202 comprising a device below for connection to the electrical supply grid placed on the floor 219 of the vertical farm.

In particular, the power supply cables 224 are made to slide inside the floor and, at one of the support feet 203a, a coupling element 220 is fixed comprising a plurality of centring and fixing holes or slots 220a and two through holes in the surface of the central upper portion.

The coupling element 220 is fixed in the desired position and at a predetermined position on the floor 219 of the vertical farm.

The coupling element 220 has a substantially convex shape, with its convex side facing upwards, in such a way as to facilitate the alignment and centring with the lower surface of the foot 203a.

One or more electrical contacts protrude through the two through holes of the coupling element 220 and supply power from the electrical distribution grid. The means for connection to the electrical distribution grid also include a ground 225.

As shown in FIG. 6a, below the foot 203a of the rigid structure 202, a portion 221 is present which is complementarily shaped and adapted to coupling with the convexity of the coupling element 220 fixed on the floor 219 and comprising one or more elements 223 able to couple with corresponding elements 224 connected to the electrical distribution grid.

The mechanical coupling between the elements 220 and 221 is of a male-female type and allows the electrical coupling of the elements 223 with the elements 224 protruding from the two holes present on the coupling element 220.

In the coupling shown in FIGS. 6 and 6a, the element 223 present in the support foot 203a is the "female" connector, while the one present in the coupling element 220 present on the floor is the "male" connector.

In an alternative embodiment, the connecting element 223 can be of a "male" type and the coupling element 220 for the floor of a "female" type.

The electrical distribution grid within the rigid structure 202, continues from the support foot 203a inside one of the vertical uprights 204, and the electric cable exits near the cross members 205 to connect through a suitable connector to the lamp or other equipment that requires electrical supply.

The electrical distribution grid serves, for example, to supply the lighting system present on the rigid frame 202 and to supply any sensors, for example sensors for the temperature of the air, the relative humidity, the concentration of $CO_2$, the parameters of the "plants' nutrient liquid" (pH, temperature, level of parts per million "PPM" or electrical conductivity "EC" of the essential nutrients of farmed plants), cameras, anemometers, pressure sensors, flow meters, valves, pressure regulators.

The water system is configured to distribute the water required for the irrigation of the plants present in the trays 100 and possibly to distribute along with it the fertilisers needed for the growth of the same (fertirrigation system). As shown in FIGS. 5, 7 and 7a-7c, at least one support foot 203a of the rigid structure 202 comprises a device 211 below for connection to the fertirrigation system placed on the floor 219 of the vertical farm.

In particular, a canalization 217 for the fertirrigation fluid is made to flow inside the floor 219 and, at one of the feet 203a, a coupling element 210 is fixed comprising centring and fixing holes or slots 210a and at least one through hole placed in the surface of the upper portion.

The coupling element 210 is fixed in the desired position and at a predetermined position on the floor 219 inside the vertical farm.

Similarly to element 220, the coupling element 210 for the water network has a substantially convex shape, with its convex side facing upwards, in such a way as to facilitate the alignment and centring with the lower surface of the foot 203a.

Through the through hole present in the element 210, it is possible to carry out the coupling of the rigid structure with the canalization 217 of the fertirrigation water network.

Figure 7A:
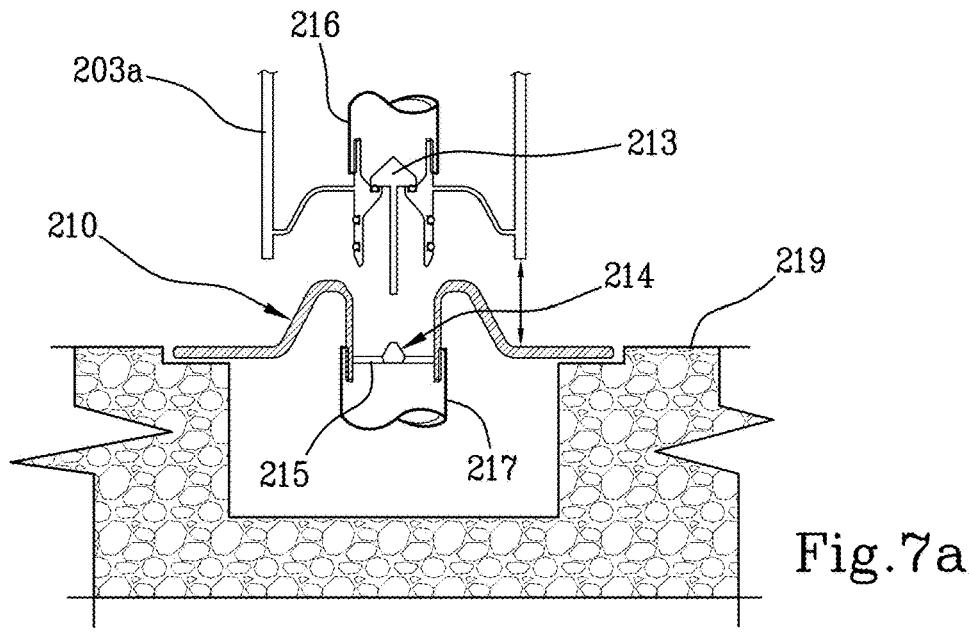
FIGS. 7a, 7b, and 7c show a sectional front view of the various phases of water coupling of the rigid structure of FIG. 7 with the water network of the fertirrigation system.
Figure 7B:
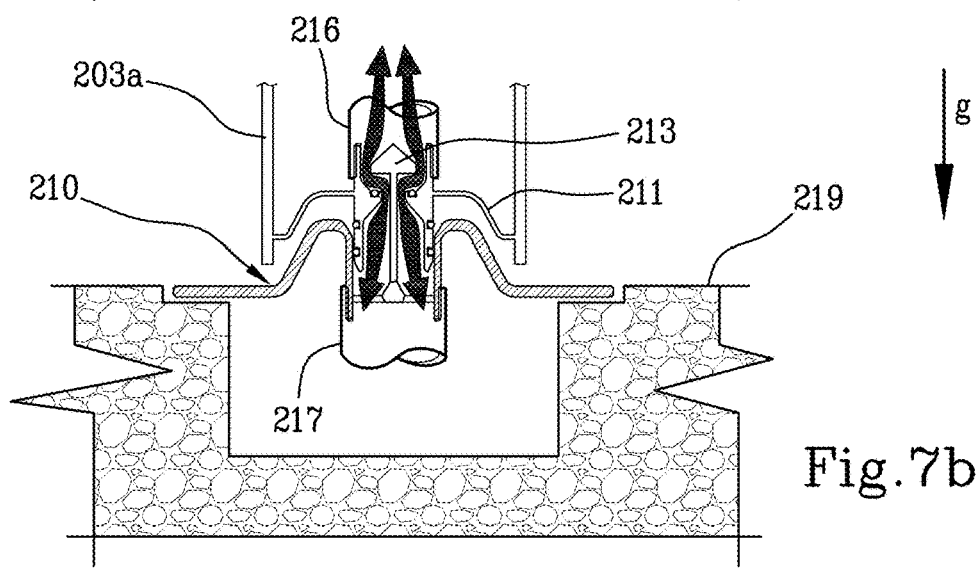
Figure 7C:
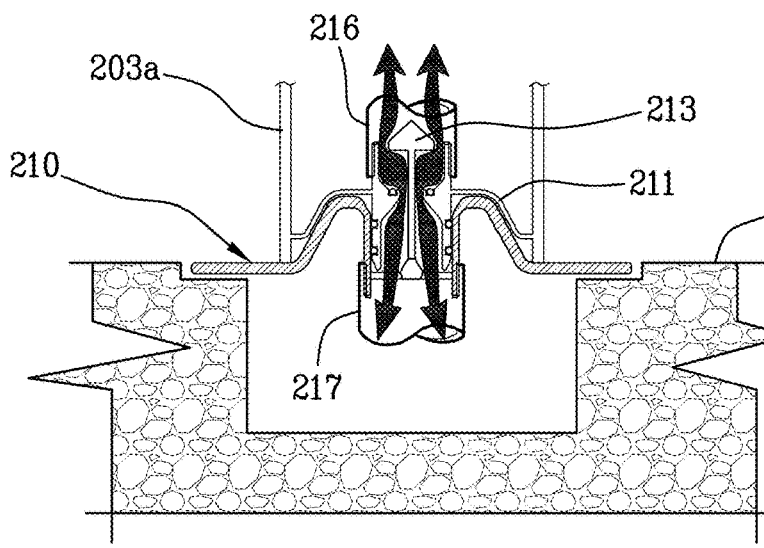

As shown in FIGS. 7a, 7b and 7c, under the foot 203a of the rigid structure a portion 211 is present which is complementarily shaped and adapted to be mechanically coupled with the convexity of the coupling element 210 fixed on the floor 219.

At the hole present in the element 210 fixed on the floor, in the portion 211 below the support foot 203a, there is a coupling element present inside which a poppet valve 213 is arranged, with a stem that extends downwards and along a direction substantially parallel to the longitudinal axis of the foot 203a of the rigid structure.

The poppet valve 213 is able to move upwards if it receives a thrust from the bottom, and move downwards by gravity or per the action of elastic means.

The poppet valve 213 moves inside the coupling element in such a way as to open or close the fluid connection with the water system of the rigid structure.

In this way, when the rigid structure 202 is located in a position raised from the ground, wherein the feet 203a do not touch the floor 219, the poppet valve 213 by the force of gravity or per the action of elastic means is in a fully lowered position, thus keeping the fluid connection closed inside the rigid structure itself. In this way, the dripping of any residual fertirrigation liquid is avoided, which should remain inside the canalization 216 present inside the rigid structure 202.

As shown in the lowering sequence of the rigid structure 202 in FIGS. 7a, 7b and 7c, when the movement means 201 lower the rigid structure toward the floor 219, at the connection 210, the push-valve 214 present inside acts on the lower part of the stem of the valve 213 and causes it to move upwards, in a direction parallel to the longitudinal axis of the foot 203a, opening the fluid connection. In this way, when the rigid structure 202 touches the ground at the element 210, the valve 213 is completely raised from the closed position, allowing fluid communication with the fertirrigation network of the vertical farm.

The poppet valve 213 is able to move upwards if it receives a thrust from the bottom, thereby opening the fluid connection with the water canalization present inside the rigid structure, and move downwards by gravity or per the action of elastic means (e.g. springs), closing the fluid connection with the water canalization.

The mechanical coupling between the elements 210 and 211 is of the male-female type and, through the opening of the valve 213, allows the water coupling between the canalization 216 present in the rigid structure 202 and the canalization 213 present inside the coupling element 210.

In the coupling shown in FIGS. 7a, 7b and 7c, the poppet valve 213 is present in the element 211 placed inside the support foot 203a, while the push-valve element 214 is present inside the element 210 placed on the floor 219.

In an alternative embodiment, it is possible to have the poppet valve 213 arranged in the coupling element 210, and the push-valve element 214 present inside the element 211 inside the foot 203a, so that when the foot 203a of the rigid structure is raised from the floor, the channel 217 of the centralised water network is closed, while when the foot 203a is coupled to the element 210 placed on the ground, the poppet valve 213 puts it in fluid communication with the canalization inside the rigid structure.

The system for supplying electricity and water to the entire trolley can occur by means of connections which are not necessarily integrated in the structure, but connected to it.

The water distribution network present inside the rigid structure 202 extends from the support foot 203a to the floor, continues inside one of the vertical uprights 204, and near the cross members 205 holding the trays 100, an attachment preferably in the shape of a "T" 207 is present, at the ends of which the pipes that carry the fertirrigation fluid can connect to agricultural crops present on each tray 100.

The rigid structure 202 can be made of different steel alloys that also include stainless steels. It can also be made of composite materials (matrix and reinforcing/filler), thermoplastic and thermosetting polymers and copolymers and elastomers with reinforcements of varying composition and material. They can also be made by joining metal alloys with plastic materials (thermoplastic and thermosetting polymers and copolymers) and/or composite materials.

In a third aspect, the present invention describes a system and a method for climate control in closed environments, in particular for vertical farms.

Figure 14:
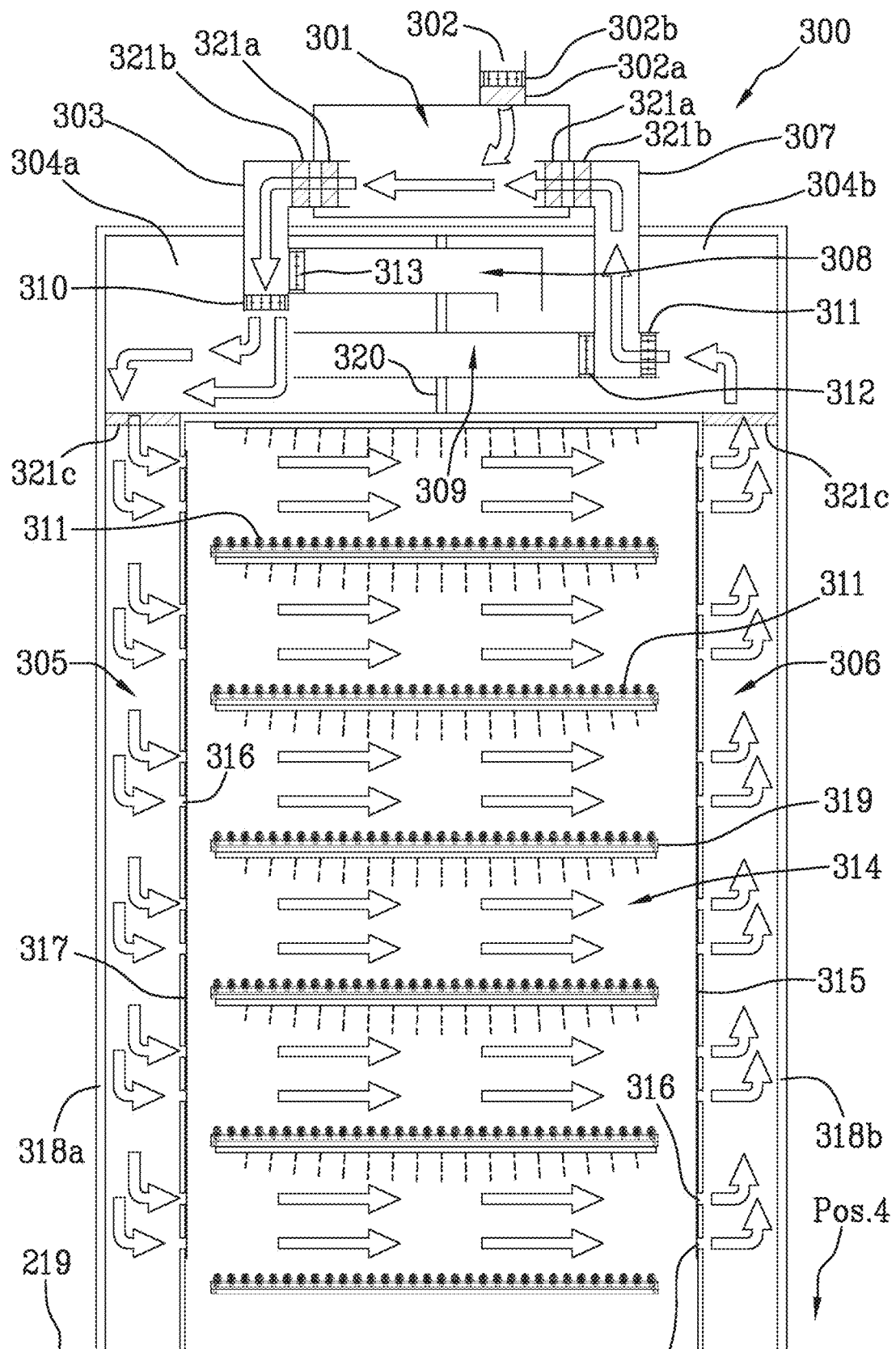
FIG. 14 shows an air conditioning system for vertical farms according to a third aspect of the present invention.

FIG. 14 shows an air conditioning system 300 for a closed environment 314, particularly a vertical farm.

The closed environment 314 to be conditioned comprises a floor 219, a ceiling and is delimited by at least two opposite, lateral side walls 318a, 318b, substantially perpendicular to the floor and to the ceiling.

Agricultural products are arranged on trays 100, in turn supported by shelvings 200 placed inside the closed environment 314 to be conditioned. The closed environment 314 can contain therein a plurality of shelvings 200.

The closed environment 314 is also delimited by a front vertical wall, provided with an access and by a rear vertical wall.

The vertical walls, the ceiling and the floor of the closed farming environment 314 can be insulated.

Inside the closed environment 314 there are artificial lighting elements 319 oriented toward the farmed agricultural products. The plurality of elements of the artificial lighting system 319 is arranged on each shelving 200, so as to adequately illuminate the agricultural products housed on each shelf.

The air conditioning system 300 is composed of an air treatment unit 301 (called "UTA"), a system of canalizations 303, 305, 306, 307, 308, 309 for the distribution and return of air, and a system of opening and closing means of the canalizations 310, 311, 312, 313 which allow, on command, the reversal of the delivery direction of the conditioned air inside the closed environment (called "alternating cycle" or "CA"), from a vertical wall 318a toward the opposite vertical wall 318b and vice versa. The direction of the air flow is such as to be substantially parallel to the floor of the closed environment, so that it can flow into the space existing between the trays 100 and reach the agricultural products 111. In particular, the flow of conditioned air (indicated by arrows between the shelves of FIGS. 14 and 15) in output from the vertical walls 318a and 318b is perpendicular thereto and arranged between two successive shelves of the shelvings, in such a way as to have a constant horizontal temperature gradient.

The air treatment unit 301 comprises an outside air intake 302 to insert an amount of external air which makes it possible to maintain the grow room 314 under positive pressure with respect to the surrounding environment.

In particular, the canalization system 303, 305, 306, 307, 308, 309 comprises a pair of first vertical canalizations 303, 307 that put the air treatment unit 301 in fluid communication with second, opposite vertical canalizations 305, 306 arranged parallel to the opposite vertical walls 318a, 318b of the closed environment 314.

The second vertical canalizations 305, 306 are arranged adjacent and substantially parallel to the opposite vertical walls 318a, 318b.

In particular, each vertical canalization 305, 306 is constituted by a cavity fashioned between the vertical wall 318a, 318b of the closed environment 314 to be conditioned and the vertical panels 315 and 317 comprising a plurality of openings 316. In this way, a plenum is created between the vertical wall 318a and 318b and the micro-perforated vertical panel 315 and 317.

Preferably, the openings 316 are arranged at the existing front space between two trays 100 arranged vertically, one above the other, in the structure 200, and are distributed uniformly over the entire surface of the panels 315 and 317. The elements 316 can be of the perforated, micro-perforated or fissured type.

The plurality of openings 316 is uniformly distributed over the entire surface of each panel 315 and 317 in such a way that the conditioned air flows homogeneously inside the closed environment 314 along a plurality of surfaces which are substantially horizontal and parallel to the floor of the environment, flowing through the space present between the trays 100 of the trolleys 200 present in the closed environment.

The panels 317 and 315 can be made of metal material, as well as plastic or composite material (matrix and reinforcing/filler) or in fabric.

In particular, the micro-perforation of the vertical panels 315 and 317 is of a high level and percentage, with small surfaces for the passage of the conditioned air. Preferably, the percentage of holes in each panel 315 and 317 is comprised in the range from 2% to 10%, more preferably in the range from 2% to 6%. The optimum value is a micro-perforation equal to 4% of the surface of the panel.

The panels 315 and 317 can be made in fabrics of various types and weaves (texturing/pattern) or in rigid materials compatible with the food sector (for example polyethylene).

Preferably, the horizontal distance between the shelves or trolleys 200 positioned behind the panels 317 and 315 is reduced to a minimum, more preferably the shelves 200 are in contact with the vertical panels 315 and 317, in such a way that the flow of conditioned air is fed horizontally directly into the vertical space present between the trays 311 and flows horizontally between the same.

In this way, as a vertical space is not present between the panel 315 or 317 and the vertical lateral surface defined by the shelving 200 positioned adjacent to the opposite vertical panels of the closed environment, the dispersion of the conditioned air flow in a substantially vertical direction (from floor to ceiling) is avoided, eliminating the risk of creating a damaging "chimney" effect.

Furthermore, by keeping the shelvings 200 in contact with the vertical panels 315 and 317, inputting a greater flow rate of conditioned air to reach the agricultural products is not necessary, avoiding the delivery of a flow of damaging and violent air. Thus the positioning of the shelvings 200 in close contact with the opposite vertical panels 315 and 317 makes it possible to convey the entire flow of conditioned air in a horizontal and uniform manner within each layer (space between two trays). In this way, a mass of uniform conditioned air is created which covers the agricultural products without shaking or damaging them.

Figure 21:
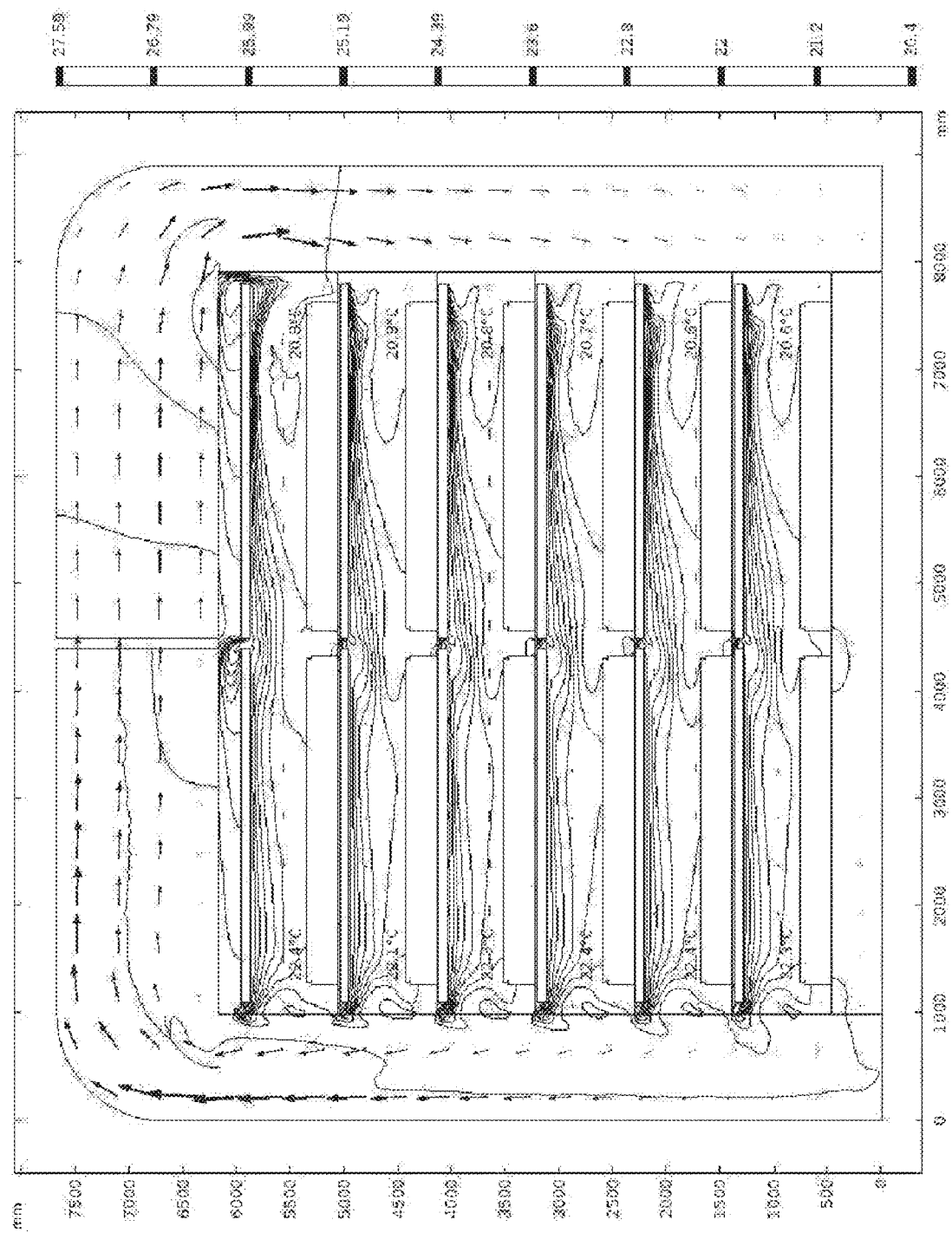
FIGS. 21 and 22 show a map of the temperature and speed of the flow of conditioned air, shown respectively in FIGS. 14 and 15.
Figure 22:
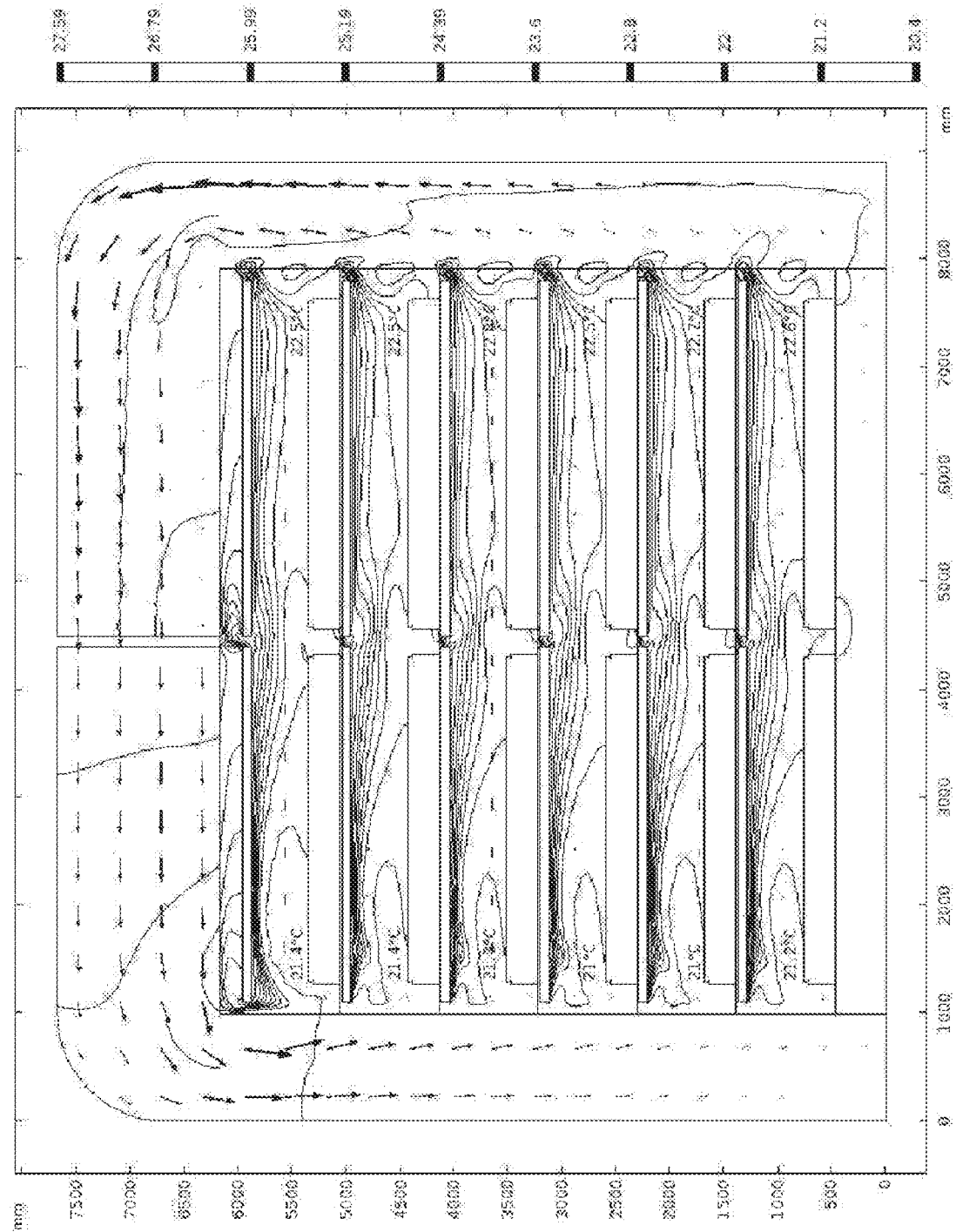

FIGS. 21 and 22 schematically show the temperature trend in centigrade or Celsius degrees in the space between two successive shelves and the direction and speed of conditioned air (the surface of the arrows represents the speed). As shown in these figures, the temperature gradient in each layer is kept substantially constant in the horizontal direction (parallel to the floor and ceiling), enabling maximum uniform growth of agricultural products along the entire surface of the relative level. Preferably, all the shelvings or trolleys 200 housed in the same closed environment are arranged laterally adjacent to each other, not merely the shelves 200 adjacent to the vertical panels 315 and 317. In this way, the trays arranged at the same height on multiple shelvings 200 constitute a sort of seamless channel for the passage of conditioned air fed from a first vertical panel 315 toward the second vertical panel 317 and vice versa. In this way it is possible to avoid having "empty" spaces or vertical "chimneys" between adjacent shelvings and the flow of conditioned air is distributed horizontally in a uniform manner.

The air conditioning system 300 comprises an overpressure system, called plenum 304, divided into two distinct parts 304a and 304b by a separator element 320, which is arranged between the first vertical canalizations 303, 307 and the second vertical canalizations 305, 306, and is configured for the uniform distribution of the conditioned air inside the closed environment 314.

The first vertical canalizations 303, 307 put the air treatment unit 301 in fluid communication with the plenum 304.

The first vertical canalizations 303, 307 selectively put the air treatment unit 301 in fluid communication, respectively with each of the two parts 304a and 304b of the plenum 304.

For example, the vertical canalization 303 puts the air treatment unit 301 in fluid communication with the first part 304a of the plenum, while a horizontal canalization 308, exiting from the end of the canalization 303 present in the section 304a, selectively puts the air treatment unit 301 in fluid communication with the second part 304b of the plenum 304.

Similarly, the vertical canalization 307 puts the air treatment unit 301 in fluid communication with the second part 304b of the plenum, while a horizontal canalization 309, exiting from the end of the canalization 307 present in the section 304b, selectively puts the air treatment unit 301 in fluid communication with the second part 304a of the plenum 304.

Preferably, the selective fluid communication with the two distinct parts 304a, 304b of the plenum 304 is obtained through shutters 310, 311, 312, 313, placed for example at the ends of the first canalizations 303, 307 present in the plenum 304.

The plenum 304 is in fluid communication with the second vertical canalizations or gaps or plenum 305, 306 fashioned between the opposite lateral walls 318a, 318b of the closed growing environment 314.

In this way, as shown in FIG. 14, the presence of the gap 305 advantageously makes it possible to convey the conditioned air in output from the plenum 304a distributed in a uniform manner over the entire vertical surface of the panel 317 and, therefore, inside the closed environment 314.

Advantageously, the conditioned air is introduced inside the closed growing environment 314 under pressure, so that the pressure inside the closed environment 314 is greater than the external pressure. This overpressure prevents potential pollutants from penetrating inside the closed growing environment.

Preferably, the closure elements 310, 311, 312, 313 of the conditioned air flow inside the canalizations 303, 305, 306, 307, 308, 309 consist of shutters.

Advantageously, the closure elements 310, 311, 312, 313 of the conditioned air flow are arranged at the ends of the first vertical ducts 307, 303

Preferably, the first and the second vertical canalizations 303, 305, 306, 307 can comprise one or more air filtering elements 321a, 321b, 321c.

The air conditioning system 300 can comprise a distributor element of the flow rate of conditioned air for sending the same with controlled proportions which gradually variate in time through the air canalizations 303, 305, 306, 307, 308, 309.

The shutters 310, 311, 312, 313, have a degree of opening which can be controlled in a cyclic manner by a microprocessor and/or by a control unit, not shown in the figures.

The shutters can preferably be of the type with opposite flaps.

Preferably, sensors can be provided for controlling the temperature, pressure, speed and humidity of the air present in the closed growing environment 314.

The air treatment unit 301 can be made of conventional materials such as steels of various types and finishes, as well as composite materials (matrix and reinforcing/filler) to increase the sanitisation possibilities of the system. The conditioned air, filtered and sanitised by filtering elements 302, 321a, 321b, 321c, is delivered into the pre-chamber plenum 304 wherein the flow loses part of its speed to the benefit of uniform distribution inside the closed environment 314 of the vertical farm.

Preferably, the canalizations 303, 305, 306, 307, 308, 309 which extend from the plenum 304 of transport and air intake, are appropriately treated with insulating material, and are made of galvanised steel, stainless steel, textile material or composite material (matrix and reinforcing/filler).

The canalizations 303, 305, 306, 307, 308, 309 for delivering and the return of air at the entry areas are made with traditional canalizations, such as a single-block of composite material (matrix and reinforcing/filler) or by means of insulated panels.

The alternate cycle system of conditioned air inside the closed growing environment 314 allows, through the system of shutters suitably positioned at the extension points, to alternate the delivery and collection from one side and the other of the environment. An automatic command and control system will adjust the cycle according to a fixed time or logic defined by the user and relating to the type of crop.

The aeration circuit can be equipped with HEPA filters (302a, 321a, 321b and 321c) capable of making it possible to obtain a level of airborne contamination compatible with the expected values for rooms in class ISO 9, ISO 8, ISO 7, ISO 6 up to ISO 5 (with reference to that which is defined in ISO 14644-1/2015).

The filters can be inserted in different positions of the circuit depending on the configuration of the system and the availability of spaces.

Preferably, the air treatment unit 301 is positioned above the ceiling of the closed environment.

Figure 15:
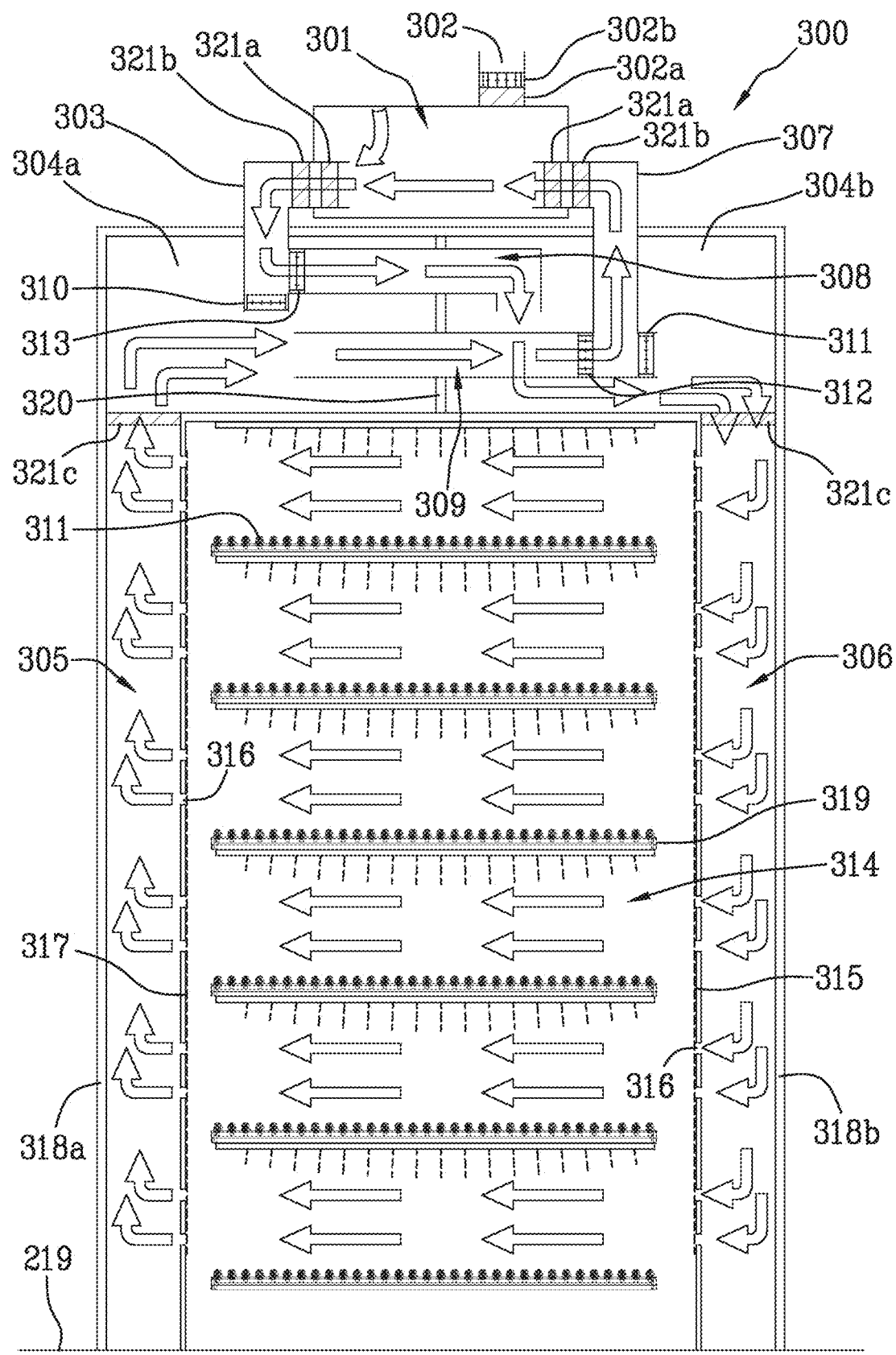
FIG. 15 shows the air conditioning system of FIG. 14, with the flow direction of the conditioned air from right to left.

Using the alternate cycle of the conditioned air according to the present invention makes it possible to cover the crops alternately from one direction and then from the opposite direction (FIG. 14 and FIG. 15 show the two possible directions of air), allowing the maximum reduction of the horizontal temperature gradient in the space present between the growing trays 100.

Preferably, the inversion of the conditioned air flow direction between a vertical wall and the opposite wall occurs with a frequency comprised between 1 and 12 times per hour, more preferably comprised between 6 and 10 times per hour.

Advantageously, the combined effect of the frequency of the inversion of the conditioned air, the shelvings laterally adjacent to each other and with the opposite vertical panels 315 and 317, makes it possible to obtain a substantially constant horizontal temperature gradient.

Through the walls of the room by means of surfaces such as those described, the distribution system makes it possible to reduce or drastically eliminate vertical temperature gradients.

The possible presence of the air expansion plenum 304 also ensures perfect uniformity in the flow along the entire air conditioning system.

As a function of the geometry of the closed environment 314 to be conditioned and the availability of adjacent spaces, the air conditioning system 300 can have many configurations:
- air treatment unit 301 located above the closed environment 314 to be conditioned;
- air treatment unit 301 located at the side or at the base of the closed environment 314;
- air treatment unit 301 integrated in the insulating structures and panels;
- the air canalizations can be made of zinc-plated steel, stainless steel, textile material or composite material (matrix and reinforcing/filler) and placed:
  - outside the closed environment 314;
  - integrated in the closed environment 314;
  - inside the closed environment 314.

The position of the absolute filters can be localised in the canalizations, as well as inside the air treatment unit 301 or, alternatively, can be placed only at the external overpressure air intake circuit 302.

The vertical air diffusion areas can affect the entire vertical wall or only portions of the same, to even be reduced to certain points of delivery/collection possibly equipped with return nozzles and/or grids.

The air conditioning system 300 can also be applied to small environments (such as automated warehouses, containers, etc.) inside which the growing and/or manual/automatic movement of growing trays 100 is envisaged. In these environments, even if the application of an alternate cycle is not always possible due to the confined spaces, absolute HEPA filters can instead be used to put the room under positive pressure.

In a non-limiting embodiment, in the third aspect of the invention the movement of agricultural products, particularly for vertical farms, can be managed by a control unit that independently decides (or informs the user) how to manage the crops. Thanks to a special system of sensors, the control unit is able to recognise the plants' state of growth and thus move them autonomously. By way of example: if once a vegetable has reached a certain stage of growth it requires different climatic conditions and light, the control unit controls the automatic movement that moves the crops by means of trolleys or single trays from one room to another. The crop can also be sent to the harvesting area once it has ripened.

In the perspective of optimizing production, rooms can be used which are dedicated to germination, growth and ripening of the same plant or different agricultural products which require equal climatic conditions and light intensity. These batches or the individual trolleys or trays can follow a logic for loading and unloading of the type LIFO (Last In First Out) or a FIFO logic (First In, First Out).

In a fourth aspect, the present invention describes a closed growing environment 401 for agricultural products 111, particularly for vertical farms, comprising therein a plurality of climate controlled grow rooms 314a, 314b, 314c, 314d. Each climate controlled grow room 314a, 314b, 314c is equipped with artificial lighting and has the suitable climatic conditions for a particular growth phase of agricultural products 111 and internally comprises a plurality of rigid shelvings 202 (as described in the second aspect of the invention), in turn able to house a plurality of growing trays 100 of agricultural products 111 (as described in the first aspect of the invention). The growing trays 100 or the rigid structures 202 containing the trays can be moved between the various grow rooms 314a, 314b, 314c, 314d by means of movement means 201 (as described in the second aspect of the invention).

Figure 16:
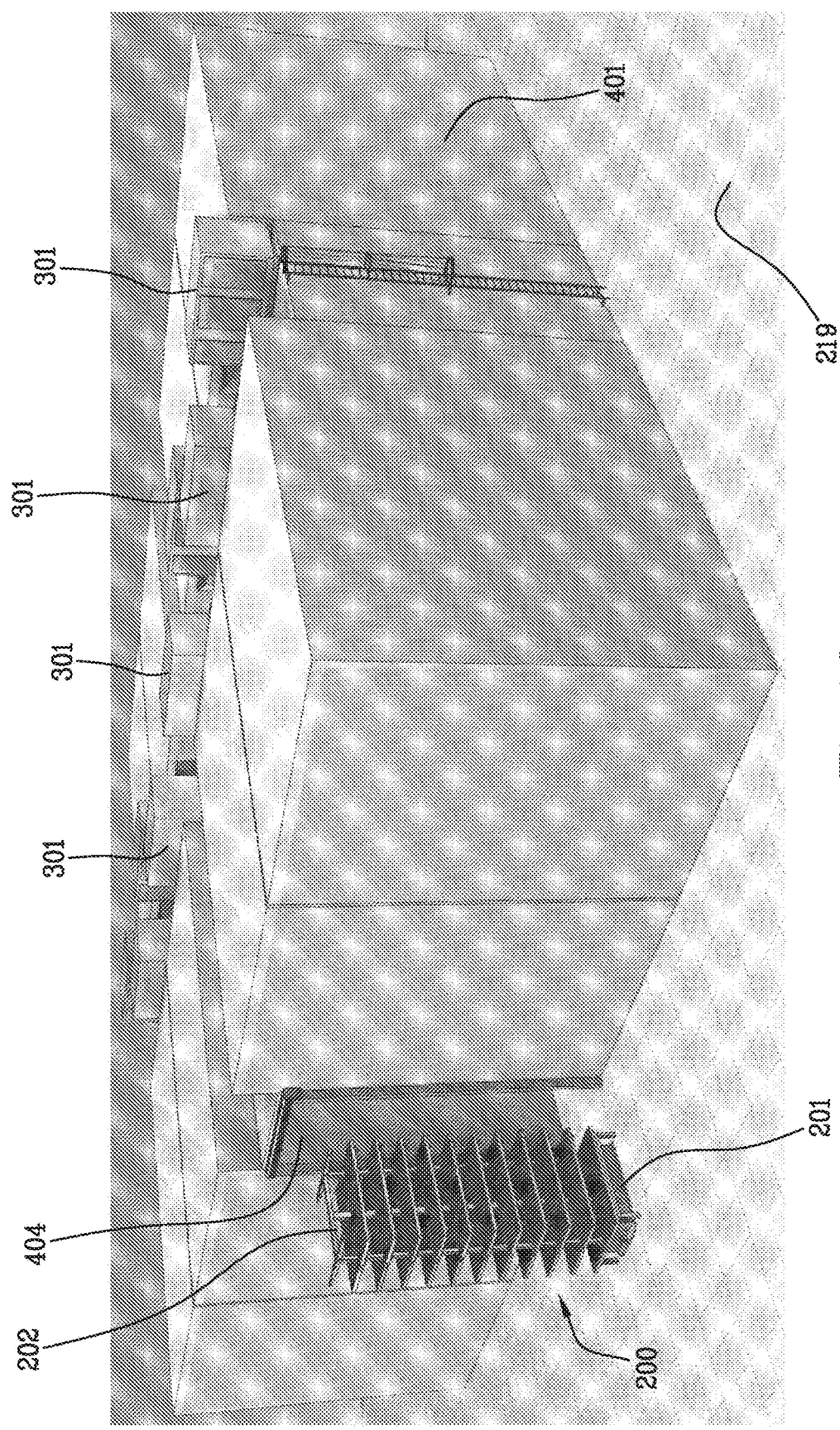
FIG. 16 shows a climate-controlled environment for vertical farms according to a fourth aspect of the present invention.

FIG. 16 shows a closed environment 401 internally comprising a plurality of rooms 314a, 314b, 314c, 314d for growing agricultural products.

Figure 17:
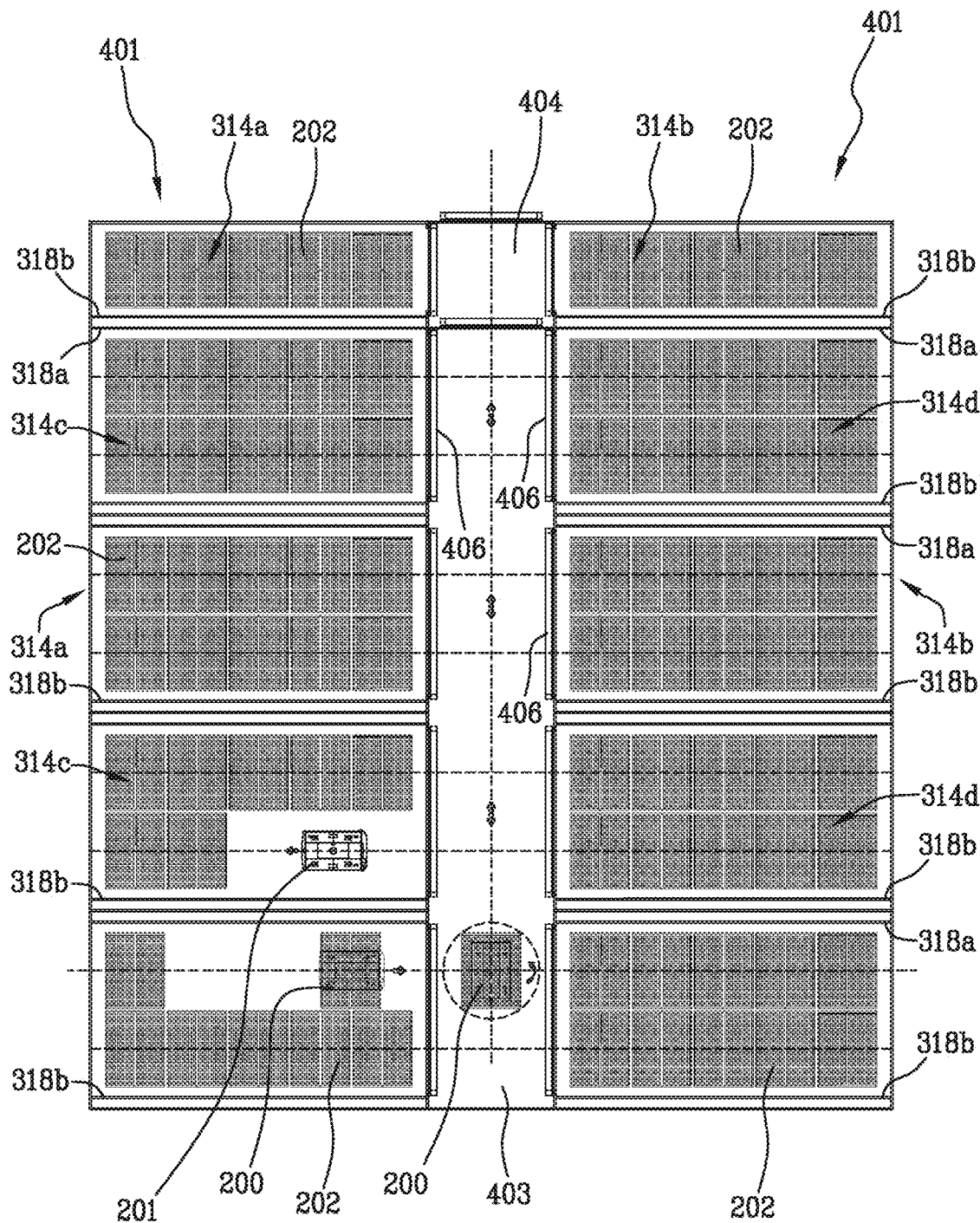
FIG. 17 shows a sectional view from above of the air conditioning system of FIG. 16 according to a first embodiment example.

In the first example embodiment of FIG. 17, the closed environment 401 comprises at least one intake area 404 adapted to let rigid structures 202 pass comprising a plurality of trays 100 with agricultural products 111, as respectively described in the first and second aspects of the present invention.

In particular, access inside the closed environment 401 takes place through an airlock 404 adapted to allow the passage of rigid structures 202 (moved by the means 201) between the external environment and the internal environment and to prevent the entry of potential germs or pollutants into the closed environment 401. Preferably, the closed environment 401 is kept in overpressure with respect to the outside environment.

The closed environment 401 includes at least one corridor 403 adapted to let the rigid frame 202 transit, for example, from a first grow room 314a, 314b, 314c, 314d to a second room 314a, 314b, 314c, 314d.

Each grow room 314a, 314b, 314c, 314d contained inside the closed environment 401 is equipped with an air treatment system 301 as described above in the third aspect of the present invention. In particular, the opposite vertical walls 318a, 318b of each grow room 314a, 314b, 314c, 314d will be equipped with a plurality of openings connected to the air treatment unit 301 by means of a system of air canalizations in such a way as to allow, on command, the reversal of the direction of delivery of the conditioned air inside each growing room (called "alternate cycle"), from a vertical wall 318a toward the opposite vertical wall 318b and vice versa (as shown in the third aspect of the invention). The air flow direction is such as to be substantially parallel to the floor of the closed environment, so that it can flow into the existing space between the trays 100 of each rigid structure 202 and reach the agricultural products.

Each grow room 314a, 314b, 314c, 314d will be equipped with an air conditioning system and an artificial lighting system suitable for a certain type of plants and for a given phase of growth, e.g. for plant products 111 having the same irradiation needs and air conditioning parameters. The grow rooms 314a, 314b,314c and 314d can have different pressures.

The grow rooms 314a,314b,314c and 314d are mutually climatically isolated, separate and independent such to avoid the possibility that the pathogenic elements or contaminants in one of them can propagate inside the closed environment 401 that contains them or within other grow rooms 314a, 314b,314c and 314d present therein. These grow rooms are not in communication with each other, as they are separated by solid walls, preferably of the insulating type, and preferably by an "anteroom" or corridor.

In particular, having differentiated, independent, microbiologically stable growing rooms with ad hoc microclimates makes it possible to grow different types of plants in the same room having different stages of growth, but requiring the same type of environmental conditions. These rooms with different intensities and colour spectrums of light, temperature, humidity, CO2 and conditioned air delivery speed meet the requirements useful to the fruit or vegetable product in that particular stage of development.

The method of growing agricultural products in closed environments according to the invention makes it possible to accurately reproduce the alternation of seasons, typically/preferably with germination with more humid and cold climates (in most cases germination occurs at 18° and with 95±5% humidity), while sprouting and ripening occur with warmer or hot climates.

Moreover, the presence of the overpressure inside each grow room 314a,314b,314c and 314d makes it possible to protect the agricultural products present within each of them from pathogenic elements and contaminants.

The product growing system according to the present invention is a dynamic system which adapts the climatic conditions, the height of layers and the intensity of light in a personalised manner in relation to the type of plant and the particular state of growth of the vegetable product.

Figure 18:
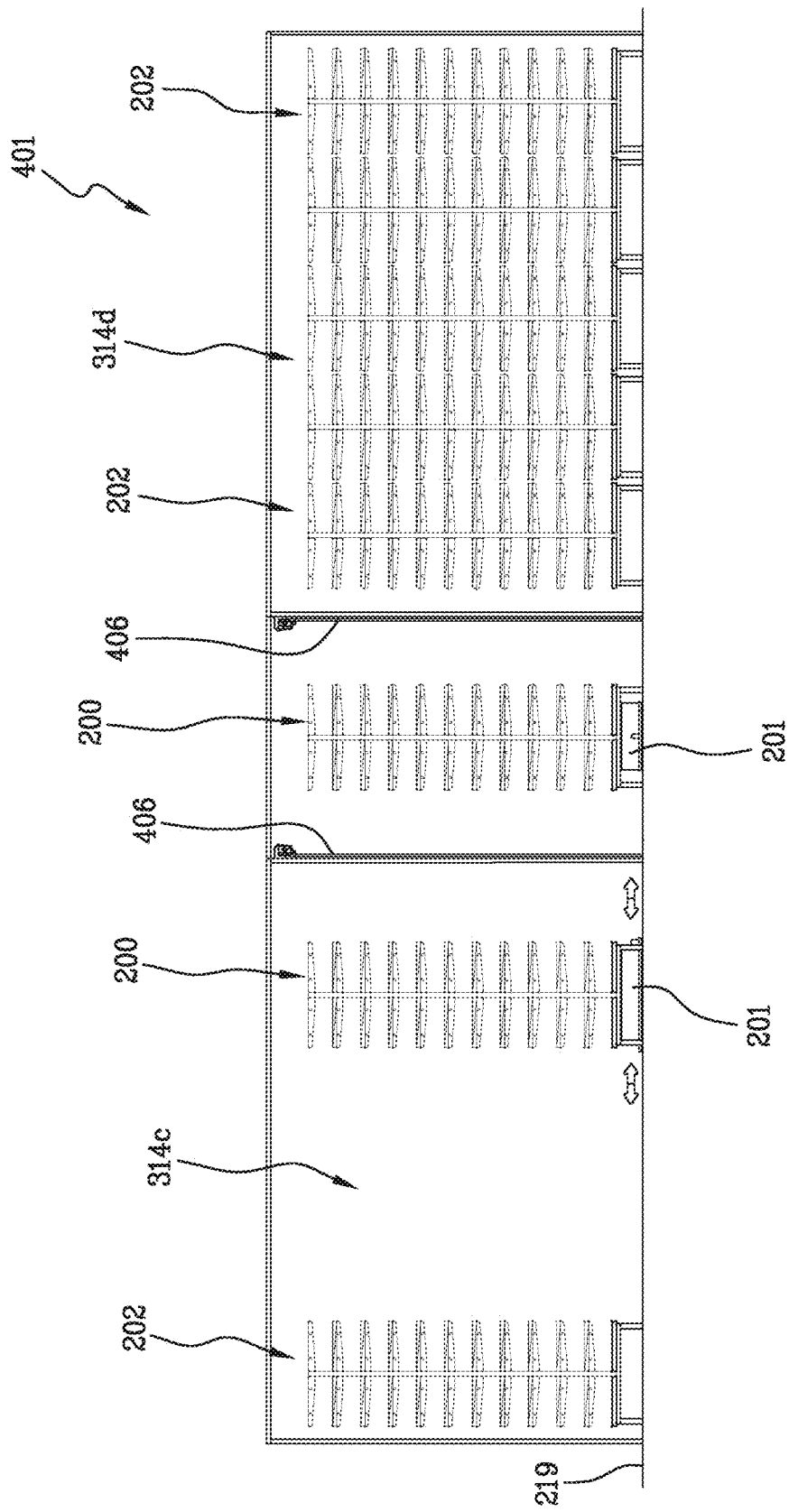
FIG. 18 shows a front section of the air conditioning system of FIG. 16.

Moreover, in the embodiment shown in FIGS. 17 and 18, each differentiated grow room 314a, 314b, 314c, 314d comprises an access 406 adapted to let the rigid frame 202 transit and preserve the air conditioning parameters contained therein.

The access 406 to each differentiated grow room 314a, 314b, 314c, 314d takes place for example through a closing slide adapted to maintain the pressure and air conditioning of each room and open and close to let the moved rigid frame 202 transit.

Preferably, the rigid frame 202 is moved by movement means 201.

Preferably, the plurality of rigid frames 202 is arranged inside the differentiated grow rooms 314a, 314b, 314c, 314d in such a way as to facilitate its extraction from the room, through the access 406 to the corridor 403 of the closed environment 401. For example, the rigid frames 202 can be arranged inside the grow rooms with a longitudinal axis of development of the trays 100 parallel to the access 406 to the differentiated grow room 314a, 314b, 314c, 314d wherein they are positioned in such a way as to facilitate the engagement by the movement means 201.

Figure 19:
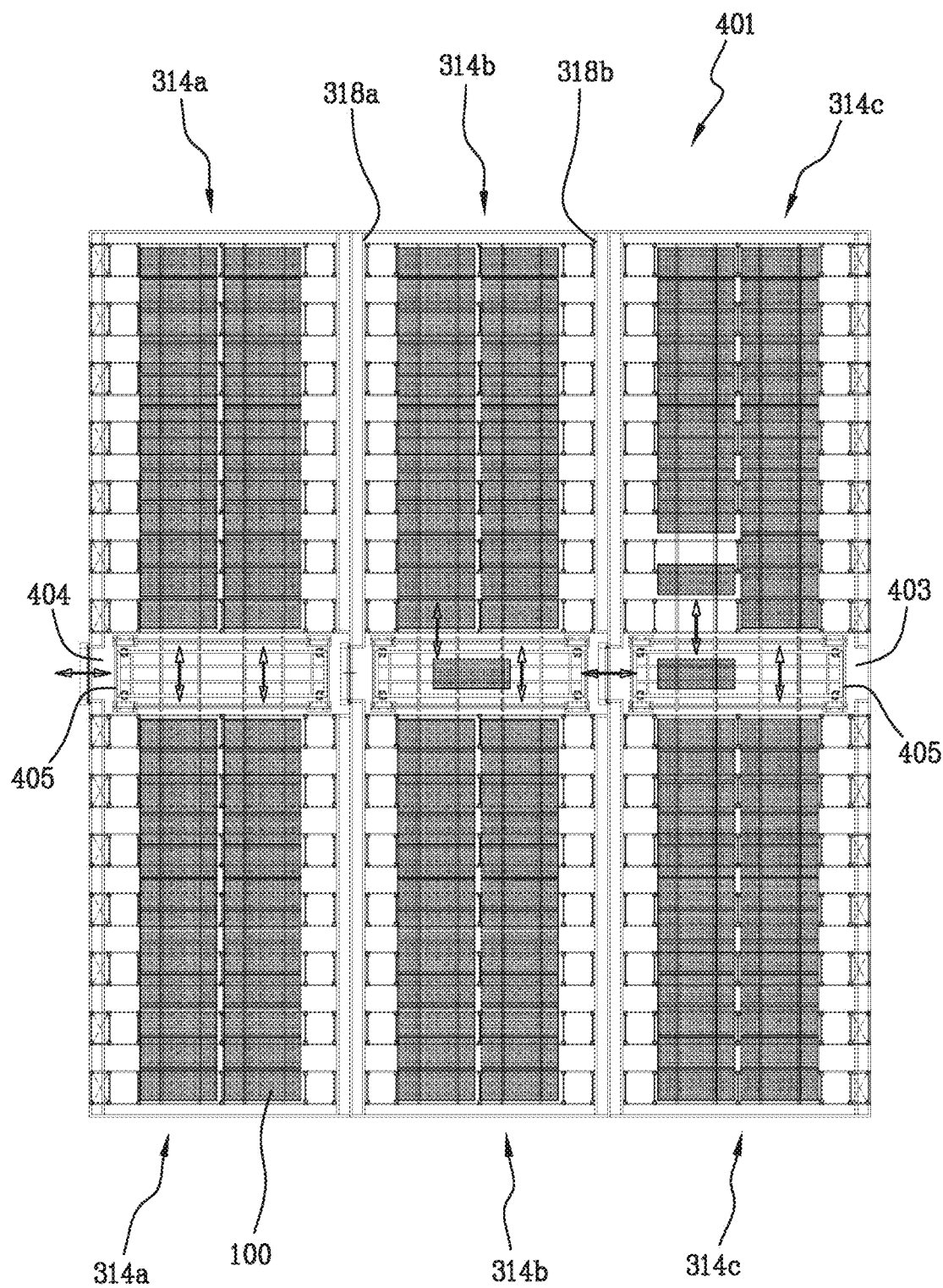
FIG. 19 shows a sectional view from above of the air conditioning system of FIG. 16, according to a second example embodiment.

In the second embodiment illustrated in FIG. 19, the corridor is occupied by a plurality of systems for the movement of the trays or "shuttle" 405, each adapted to move in the vertical direction, perpendicular to the floor 219 of the closed environment 401, and pick up the individual trays 100 from the inside of one or more differentiated grow rooms 314a, 314b, 314c, 314d. In both the example embodiments described in FIGS. 17 and 19, the differentiated grow rooms 314a, 314b, 314c, 314d comprise a plurality of associated environmental sensors in each differentiated grow room 314a, 314b, 314c, 314d. Each sensor will be configured to detect a representative signal of the lightening intensity and climate control parameters of the environment inside each climate controlled room 314a, 314b, 314c, 314d.

Preferably, the plurality of associated environmental sensors in each differentiated grow room 314a, 314b, 314c, 314d can comprise first sensors adapted to detect a representative signal of the lightening intensity, second sensors adapted to detect the climate control parameters of the environment in the climate controlled rooms 314a, 314b, 314c, 314d and third sensors adapted to detect the growth stage of the agricultural products 111.

In a non-limiting embodiment, the parameters detected by each sensor present in each differentiated grow room 314a, 314b, 314c, 314d, will be sent to a control unit, configured to autonomously decide (or inform the user) how to manage the products grown. In this way, depending on the type of agricultural product and its growth phase, the control unit will be able to recognise the state of growth of the agricultural products and then move them autonomously.

By way of non-limiting example, if once a vegetable has reached a certain stage of growth it requires different climatic conditions and light, the control unit controls the movement automatisms that moves the crops by means of trolleys or single trays from one room to another. The crop can also be sent to a harvesting area once it has ripened.

In the perspective of optimizing production, rooms can be used which are dedicated to germination, growth and ripening of the same plant or different agricultural products which require equal climatic conditions and light intensity. These batches or the individual trolleys or trays can follow a logic for loading and unloading of the type LIFO (Last In First Out) or a FIFO logic (First In, First Out).

In particular, the invention also addresses a method for growing agricultural products in closed environments, particularly for vertical farms. The method comprises the steps of:
- arranging the agricultural products on a plurality of trays 100;
- arranging the plurality of trays 100 on a plurality of rigid frames 202;
- arranging the plurality of rigid frames 202 in a plurality of climate-controlled grow rooms 314a, 314b, 314c, 314d inside a closed environment 401, each room 314a, 314b, 314c, 314d having artificial lighting and optimized climatic conditions adapted to a specific growth phase of the agricultural products;
- moving one or more rigid frames 201 from a first grow room 314a, 314b, 314c, 314d to a second grow room 314a, 314b, 314c, 314d having artificial lighting parameters and differentiated climate control based on a determined growth phase of the agricultural products present in the moved rigid frame 202.

Figure 20:
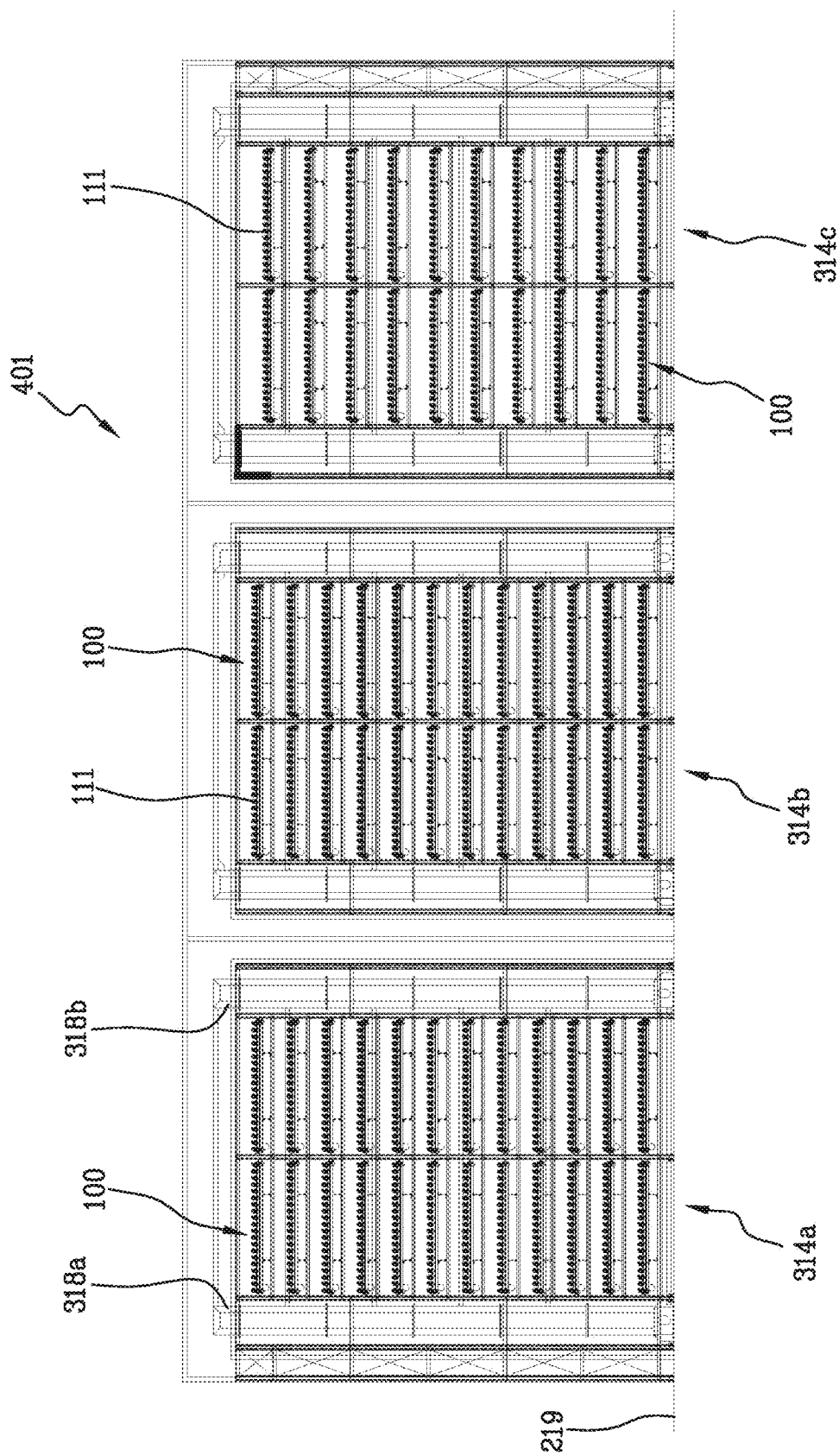
FIG. 20 shows a section of the air conditioning system of FIG. 16.

In summary, the invention as described in the fourth aspect, and in particular as shown in FIGS. 19 and 20, makes it possible to move the agricultural products 111 in rooms with lamps of a greater light intensity (increased emission of µmol/m$^2$/sec) based on the various stages of plant growth 111.

During the stages of plant growth, the plants can be moved in rooms with different climatic conditions which are more appropriate to that particular stage of growth.

One or more plants of different species can grow inside the same room having suitable climatic conditions.

In this way, the following advantages are obtained:
- targeted staging of grow rooms with lamps of an intensity suited to the type of plant and its specific stage of growth, thereby improving profit and growth in production;
- considering that the air conditioning serves mainly to counteract the heat (both latent and sensitive) produced by the artificial light sources, having grow rooms with various intensities of artificial light (and therefore different electrical absorption) makes it possible to provide an air treatment unit of ad hoc sizes related to the use conditions. This results in a lower initial investment, and savings in material and energy consumption;
- contrary to the currently existing vertical greenhouses which partially turn off or reduce certain lights in certain phases of growth, equipping these rooms with lights of medium/low power and other rooms with lights of medium/high power, makes it possible to save on the initial investment, energy management and have a lower environmental impact.

Preferably, the lightening elements are dimmable, in such a way as to be able to adjust the intensity and the colour spectrum of light.

The method and system for growing agricultural products according to the present invention preferably envisages trays containing a plurality of agricultural products moved by anthropomorphic robots, 3D shuttles, traslo-automatic elevators and high-technology machinery that is not operated by human beings but through accurate software. In this way, the presence of human operators is eliminated in the various grow rooms, thereby minimizing the risk of contamination.

The present invention has numerous advantages.
- lower initial investment;
- flexibility of grow rooms and the possibility to grow multiple different products;
- increased production, more cycles per year, better yield per square metre;
- lower energy consumption;
- uniformity in the decay of the lamps (same functions for all modules);
- constant climate in the rooms and greater uniformity;
- possibility of providing a cooling phase of the plants before cutting to obtain a healthier product with greater shelf-life and suppress pathogenic elements.

That which has been described above in relation to a plurality of trays arranged on shelves of mobile shelvings or trolleys 200 is intended to be extended also to static shelvings configured to house a plurality of trays that are moved between the various shelvings 200 present in the various closed, air-conditioned environments in relation to the various phenological phases of the agricultural products treated.

The invention claimed is:

1. A method for growing agricultural products in closed environments, comprising the steps of:
   - arranging agricultural products directly on a plurality of trays;
   - arranging the plurality of trays in a plurality of air conditioned grow rooms inside a closed environment, each room having artificial lighting and optimised climatic conditions for a determined type of agricultural products or for a specific growth phase of the agricultural products;
   - moving the trays from a first grow room to a second grow room, each grow room having artificial lighting parameters and differentiated climate control based on a certain growth phase of the agricultural products moved;
   - wherein each grow room is climatically separated and isolated from the others so that the grow rooms are not in communication with each other and an access to each grow room takes place through a closing slide adapted to maintain the pressure and air conditioning of each room;
   - wherein each differentiated grow room is air conditioned by an independent air treatment unit provided with an overpressure system having a pre-chamber and the method further comprises the steps of:
     - withdrawing air from an outside air intake of the overpressure system;
     - delivering air into the pre-chamber of the overpressure system wherein the flow loses part of its speed to benefit of uniform distribution inside the grow room;
     - introducing the air inside each grow room under pressure, so that the pressure inside the grow room is greater than an external pressure; uniformly distributing and taking the flow of conditioned air into each differentiated grow room through a plurality of channels connected to said air treatment unit;

recirculating the air introduced in the grow room from said grow room to the overpressure system;

wherein the method further comprises filtering both the air withdrawn from the outside and the air recirculated by the air treatment unit by HEPA filters configured to obtain a level of airborne contamination compatible with the expected values for rooms up to at least ISO 7, and wherein the closed environment comprises at least one corridor adapted for the transit of the one of the plurality of trays, wherein the corridor is air conditioned by an independent air treatment unit; each grow room being separated by an adjacent grow room by said corridor, so that moving the trays from the first grow room to the second grow room provides for crossing said corridor.

2. The method for growing agricultural products in closed environments according to claim 1, wherein each of the plurality of trays is moved by a movement means.

3. The method for growing agricultural products in closed environments according to claim 1, wherein each differentiated grow room comprises at least two opposite vertical walls adapted to generate a flow of conditioned air from a first vertical wall towards the opposite vertical wall of the room and to invert alternatively the air conditioned delivery direction along a direction that is substantially parallel to the floor of the room so as to hit the inside of the room alternatively from one direction and subsequently from the opposite direction.

4. The method for growing agricultural products in closed environments according to claim 1, further comprising a plurality of sensors associated in each differentiated grow room, with a control unit associated with said plurality of sensors present in said plurality of rooms configured to determine when to move the agricultural products based on the growth phase.

5. The method for growing agricultural products in closed environments according to claim 4, wherein said plurality of associated environmental sensors in each differentiated grow room comprises:

first sensors adapted to detect a signal representative of the light intensity;

second sensors adapted to detect climate-control parameters of the environment in the air conditioned room;

third sensors adapted to detect the growth phase of the agricultural products.

6. A system for growing agricultural products in closed environments, comprising:

a plurality of rigid frames, each of the rigid frames comprising a plurality of vertical uprights and a plurality of horizontal cross members, on which a plurality of trays can be arranged such that the plurality of trays are vertically spaced apart from each other, one directly vertically above another, on the rigid frame, and such that ones of the agricultural products can be arranged directly on each of the plurality of trays;

a plurality of rooms for growing agricultural products inside a closed environment, each room being adapted to contain one or more of the plurality of rigid frames on which a plurality of trays are arranged and being climatically separated and isolated from the others so that the grow rooms are not in communication with each other and an access to each grow room takes place through a closing slide adapted to maintain the pressure and air conditioning of each room; and at least one corridor adapted for the transit of the one of the plurality of trays and interposed between two adjacent grow rooms, so that moving the trays from a first grow room to a second grow room provides for crossing said corridor;

wherein each differentiated grow room and said corridor comprises an independent air treatment unit provided with an overpressure system having a pre-chamber, said air treatment unit being configured to:

withdraw air from an outside air intake of the overpressure system;

deliver air into the pre-chamber of the overpressure system wherein the flow loses part of its speed to benefit of uniform distribution inside the grow room;

introduce the air inside each grow room under pressure, so that the pressure inside the grow room is greater than an external pressure;

uniformly distribute and taking the flow of conditioned air into each differentiated grow room through a plurality of channels connected to said air treatment unit;

recirculate the air introduced in the grow room from said grow room to the overpressure system;

wherein the air treatment unit comprises HEPA filters positioned to filter both the air withdrawn from the outside and the air recirculated by the air treatment unit and configured to obtain a level of airborne contamination compatible with the expected values for rooms up to at least ISO 7.

* * * * *